(12) United States Patent
Kamigata et al.

(10) Patent No.: US 7,647,473 B2
(45) Date of Patent: Jan. 12, 2010

(54) INSTRUCTION PROCESSING METHOD FOR VERIFYING BASIC INSTRUCTION ARRANGEMENT IN VLIW INSTRUCTION FOR VARIABLE LENGTH VLIW PROCESSOR

(75) Inventors: Teruhiko Kamigata, Kawasaki (JP); Hideo Miyake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 574 days.

(21) Appl. No.: 10/053,707

(22) Filed: Jan. 24, 2002

(65) Prior Publication Data
US 2002/0161986 A1 Oct. 31, 2002

(30) Foreign Application Priority Data
Apr. 25, 2001 (JP) .............................. 2001-128368

(51) Int. Cl.
*G06F 15/00* (2006.01)
*G06F 9/45* (2006.01)
(52) U.S. Cl. .......................................... 712/24; 717/161
(58) Field of Classification Search ................ 717/161; 718/102; 712/24, 206, 244
See application file for complete search history.

(56) References Cited

U.S. PATENT DOCUMENTS

| | | | | |
|---|---|---|---|---|
| 5,488,729 A * | 1/1996 | Vegesna et al. | .............. | 712/209 |
| 5,561,774 A | 10/1996 | Aikawa et al. | | |
| 5,640,588 A * | 6/1997 | Vegesna et al. | .............. | 712/23 |
| 5,649,135 A * | 7/1997 | Pechanek et al. | ............ | 712/200 |
| 5,680,637 A * | 10/1997 | Hotta et al. | ................... | 712/24 |
| 5,787,303 A * | 7/1998 | Ishikawa | ..................... | 712/24 |
| 5,884,060 A * | 3/1999 | Vegesna et al. | ............. | 712/215 |
| 5,922,065 A | 7/1999 | Hull et al. | | |
| 5,930,508 A * | 7/1999 | Faraboschi et al. | .......... | 717/158 |
| 5,931,939 A | 8/1999 | Jacobs | | |
| 6,023,756 A | 2/2000 | Okamura | | |
| 6,044,451 A | 3/2000 | Slavenburg et al. | | |
| 6,178,492 B1 * | 1/2001 | Matsuo | ........................ | 712/23 |
| 6,549,930 B1 * | 4/2003 | Chrysos et al. | ............. | 718/104 |
| 6,738,893 B1 * | 5/2004 | Rozas | ......................... | 712/24 |
| 6,760,906 B1 * | 7/2004 | Odani et al. | ................ | 717/149 |
| 6,779,107 B1 * | 8/2004 | Yates | ......................... | 712/229 |
| 6,789,181 B1 * | 9/2004 | Yates et al. | .................... | 712/4 |
| 7,096,343 B1 * | 8/2006 | Berenbaum et al. | .......... | 712/24 |
| 7,401,204 B1 | 1/2008 | Miyake et al. | | |

FOREIGN PATENT DOCUMENTS

| | | |
|---|---|---|
| EP | 1089168 A2 * | 4/2001 |
| JP | 9-292991 | 11/1997 |

(Continued)

OTHER PUBLICATIONS

"Advanced Compiler Design And Implementation", Steven S. Muchnick, published Aug. 19, 1997, Chapter 17, Code Scheduling pp. 531-575.*

(Continued)

*Primary Examiner*—Larry D Donaghue
(74) *Attorney, Agent, or Firm*—Staas & Halsey LLP

(57) ABSTRACT

An instruction processing method for checking an arrangement of basic instructions in a very long instruction word (VLIW) instruction, suitable for language processing systems, an assembler and a compiler, used for processors which execute variable length VLIW instructions designed based on variable length VLIW architecture.

16 Claims, 34 Drawing Sheets

FOREIGN PATENT DOCUMENTS

JP  2000-163266  6/2000
JP  2001-100997  4/2001

OTHER PUBLICATIONS

Power Exploration For Embedded VLIW Architecture, ACM, Nov. 2000, pp. 498-503.*
Resources Usage Models for Instruction Scheduling Two New Models and Classification, ACM, 1999, pp. 417-424.*
"Computer Architecture A Quantivitative Approach", Second Edition, David A. Patterson et al, 1995, pp. 284-335.*
"Computer Architecture A Quantitative Approach", Second Edition, David A. Patterson and John L. Hennessy, 1996, Chapter 4, pp. 220-362.*
Intel Technology Journal $4^{th}$ Quarter 1999, An Overview of the Intell IA-64 Compiler, Carole Dulong et al. pp. 1-15.*
HP Laboratories Technical Report Machine Description Driven Compiler for EPIC Processors, B. Ramakrishna Rau et al, Sep. 1998, pp. 1 82.*
EP 02 25 0684 European Search Report Report Generated Jun. 14, 2005.
Japanese Office Action mailed on Jun. 9, 2009 for corresponding Japanese Patent Application 2001-128368.

* cited by examiner

FIG. 2

| 0x00000000 | ADD | FADD | ADD | FADD | ← VLIW 1 |
|---|---|---|---|---|---|
| 0x00000010 | NOP | NOP | ADD | NOP | ← VLIW 2 |
| 0x00000020 | NOP | NOP | NOP | NOP | |
| 0x00000030 | NOP | FADD | NOP | NOP | ← VLIW 3 |
| 0x00000040 | NOP | NOP | | | |

○
○
○

PRIOR ART

PRIOR ART

PRIOR ART

FIG.7

| BASIC INSTRUCTION | INSTRUCTION SLOT | | | | | |
|---|---|---|---|---|---|---|
| | SLOT 0 | SLOT 1 | SLOT 2 | SLOT 3 | SLOT 4 | SLOT 5 |
| ADD | ○ | — | ○ | — | — | — |
| FADD | — | ○ | — | ○ | — | — |
| BRA | — | — | — | — | ○ | ○ |

○ : ASSIGNABLE
— : NOT ASSIGNABLE

PRIOR ART

PRIOR ART

PRIOR ART

FIG.11

| INSTRUCTION SLOT 0 | INSTRUCTION SLOT 1 | INSTRUCTION SLOT 2 | INSTRUCTION SLOT 3 |
|---|---|---|---|
| I0 | F0 | I1 | F0 |
| I0 | F0 | I1 | B0 |
| I0 | F0 | I1 | |
| I0 | F0 | I1 | B0 |
| I0 | F0 | F1 | |
| I0 | F0 | F1 | B0 |
| I0 | F0 | B0 | B1 |
| I0 | F0 | B0 | |
| I0 | F0 | | |
| I0 | I1 | B0 | B1 |
| I0 | I1 | B0 | |
| I0 | I1 | | |
| F0 | F1 | B0 | B1 |
| F0 | F1 | B0 | |
| F0 | F1 | | |
| I0 | B0 | B1 | |
| I0 | B0 | | |
| I0 | | | |
| F0 | B0 | B1 | |
| F0 | B0 | | |
| F0 | | | |
| B0 | B1 | | |
| B0 | | | |

FIG.12

| | | | | |
|---|---|---|---|---|
| 0x00000000 | ADD | FADD | ADD | FADD | ← VLIW INSTRUCTION 1
| 0x00000010 | ADD | FADD | BASIC INSTRUCTION 0 | BASIC INSTRUCTION 1 | ← VLIW INSTRUCTION 2 / VLIW INSTRUCTION 3
| 0x00000020 | BASIC INSTRUCTION 2 | BASIC INSTRUCTION 3 | BASIC INSTRUCTION 0 | BASIC INSTRUCTION 1 |
| 0x00000030 | BASIC INSTRUCTION 0 | BASIC INSTRUCTION 0 | BASIC INSTRUCTION 1 | BASIC INSTRUCTION 2 |
| 0x00000040 | BASIC INSTRUCTION 3 | BASIC INSTRUCTION 0 | | |

INSTRUCTION RESISTER 22

| | | | | | |
|---|---|---|---|---|---|
| TIME 1 | ADD | FADD | ADD | FADD | ← VLIW 1 |
| TIME 2 | ADD | | | | ← VLIW 2 |
| TIME 3 | FADD | | | | ← VLIW 3 |

FIG.18

| BASIC INSTRUCTION | FUNCTIONAL UNIT CLASSIFICATION |
|---|---|
| ADD | IU |
| FADD | FU |
| BRA | BU |

IU : EXECUTABLE BY INTEGER UNITS
FU : EXECUTABLE BY FLOATING UNITS
BU : EXECUTABLE BY BRANCH UNIT

FIG.19

| LOGICAL INSTRUCTION SLOT | ASSIGNABLE FUNCTIONAL UNIT CLASSIFICATION | | |
|---|---|---|---|
| | IU | FU | BU |
| 0 | ○ | — | — |
| 1 | — | ○ | — |
| 2 | ○ | — | — |
| 3 | — | ○ | — |
| 4 | — | — | ○ |
| 5 | — | — | ○ |

○ : EXECUTABLE  — : NOT EXECUTABLE

FIG.20

| PHYSICAL INSTRUCTION SLOT | INSTRUCTION INFORMATION ASSIGNED |
|---|---|
| INSTRUCTION SLOT 0 | — |
| INSTRUCTION SLOT 1 | — |
| INSTRUCTION SLOT 2 | — |
| INSTRUCTION SLOT 3 | — |

— : NOT ASSIGNED   ○ : ASSIGNED

FIG.21

| FUNCTIONAL UNIT | FUNCTIONAL UNIT NUMBER OF EACH FUNCTIONAL UNIT TO WHICH BASIC INSTRUCTION IS ASSIGNED (BIT PATTERN) | | | |
|---|---|---|---|---|
| | 0 | 1 | 2 | 3 |
| IU | — | — | — | — |
| FU | — | — | — | — |
| BU | — | — | — | — |

○ : ASSIGNED   — : NOT ASSIGNED

FIG.23

| BASIC INSTRUCTION OPERATION CODE | FUNCTIONAL UNIT CLASSIFICATION | FUNCTIONAL UNIT NUMBER OF FUNCTIONAL UNIT CLASSIFICATION | | | |
|---|---|---|---|---|---|
| | | 0 | 1 | 2 | 3 |
| ADD | IU | ○ | ○ | — | — |
| FADD | FU | ○ | ○ | — | — |
| BRA | BU | ○ | ○ | — | — |

IU : EXECUTABLE BY INTEGER UNIT

FU : EXECUTABLE BY FLOATING UNIT

BU : EXECUTABLE BY BRANCH UNIT

○ : ASSIGNABLE

— : NOT ASSIGNABLE

FIG.24

| LOGICAL INSTRUCTION SLOT | ASSIGNABLE FUNCTIONAL UNIT CLASSIFICATION | | | FUNCTIONAL UNIT NUMBER OF EACH FUNCTIONAL UNIT CLASSIFICATION | | | |
|---|---|---|---|---|---|---|---|
| | IU | FU | BU | 0 | 1 | 2 | 3 |
| 0 | ○ | — | — | ○ | — | — | — |
| 1 | — | ○ | — | ○ | — | — | — |
| 2 | ○ | — | — | — | ○ | — | — |
| 3 | — | ○ | — | — | ○ | — | — |
| 4 | — | — | ○ | ○ | — | — | — |
| 5 | — | — | ○ | — | ○ | — | — |

○ : ASSIGNABLE

— : NOT ASSIGNABLE

FIG.25

| BASIC INSTRUCTION | INSTRUCTION CATEGORY |
|---|---|
| ADD | I_1 |
| DIV | I_2 |
| FADD | F_1 |
| BRA | B_1 |

I_1 : INTEGER CATEGORY 1

I_2 : INTEGER CATEGORY 2

F_1 : FLOATING CATEGORY 1

B_1 : BRANCH CATEGORY 1

FIG.26

| LOGICAL INSTRUCTION SLOT | FUNCTIONAL UNIT CLASSIFICATION | BIT PATTERN OF FUNCTIONAL UNIT NUMBER OF EACH FUNCTIONAL UNIT CLASSIFICATION | | | |
|---|---|---|---|---|---|
| | | 0 | 1 | 2 | 3 |
| I_1 | IU | ○ | ○ | — | — |
| I_2 | IU | ○ | — | — | — |
| F_1 | FU | ○ | ○ | — | — |
| B_1 | BU | ○ | — | — | — |

○ : EXECUTABLE    — : NOT EXECUTABLE

FIG.27

| LOGICAL INSTRUCTION SLOT | ASSIGNABLE FUNCTIONAL UNIT CLASSIFICATION | | | BIT PATTERN OF FUNCTIONAL UNIT NUMBER OF EACH FUNCTIONAL UNIT CLASSIFICATION | | | |
|---|---|---|---|---|---|---|---|
| | IU | FU | BU | 0 | 1 | 2 | 3 |
| 0 | ○ | — | — | ○ | — | — | — |
| 1 | — | ○ | — | ○ | — | — | — |
| 2 | ○ | — | — | — | ○ | — | — |
| 3 | — | ○ | — | — | ○ | — | — |
| 4 | — | — | ○ | ○ | — | — | — |
| 5 | — | — | ○ | — | ○ | — | — |

○ : EXECUTABLE   — : NOT EXECUTABLE

FIG.32

| INSTRUCTION SLOT 0 | INSTRUCTION SLOT 1 | INSTRUCTION SLOT 2 | INSTRUCTION SLOT 3 | INSTRUCTION SLOT 4 | INSTRUCTION SLOT 5 | INSTRUCTION SLOT 6 | INSTRUCTION SLOT 7 |
|---|---|---|---|---|---|---|---|
| I0 | F0 | I1 | F1 | I2 | F2 | I3 | F3 |
| I0 | F0 | I1 | F1 | I2 | F2 | I3 | B0 |
| I0 | F0 | I1 | F1 | I2 | F2 | I3 | |
| I0 | F0 | I1 | F1 | I2 | F2 | F3 | B0 |
| I0 | F0 | I1 | F1 | I2 | F2 | F3 | |
| I0 | F0 | I1 | F1 | I2 | F2 | B0 | B1 |
| I0 | F0 | I1 | F1 | I2 | F2 | B0 | |
| I0 | F0 | I1 | F1 | I2 | F2 | | |
| I0 | F0 | I1 | F1 | I2 | I3 | B0 | B1 |
| I0 | F0 | I1 | F1 | I2 | I3 | B0 | |
| I0 | F0 | I1 | F1 | I2 | I3 | | |
| I0 | F0 | I1 | F1 | F2 | F3 | B0 | B1 |
| I0 | F0 | I1 | F1 | F2 | F3 | B0 | |
| I0 | F0 | I1 | F1 | F2 | F3 | | |
| I0 | F0 | I1 | F1 | I2 | B0 | B1 | |
| I0 | F0 | I1 | F1 | I2 | B0 | | |
| I0 | F0 | I1 | F1 | I2 | | | |
| I0 | F0 | I1 | F1 | F2 | B0 | B1 | |
| I0 | F0 | I1 | F1 | F2 | B0 | | |
| I0 | F0 | I1 | F1 | F2 | | | |
| I0 | F0 | I1 | I2 | I3 | B0 | B1 | |
| I0 | F0 | I1 | I2 | I3 | B0 | | |
| I0 | F0 | I1 | I2 | I3 | | | |
| I0 | F0 | F1 | F2 | F3 | B0 | B1 | |
| I0 | F0 | F1 | F2 | F3 | B0 | | |
| I0 | F0 | F1 | F2 | F3 | | | |
| I0 | F0 | I1 | F1 | B0 | B1 | | |
| I0 | F0 | I1 | F1 | B0 | | | |
| I0 | F0 | I1 | F1 | | | | |
| I0 | F0 | I1 | I2 | B0 | B1 | | |
| I0 | F0 | I1 | I2 | B0 | | | |
| I0 | F0 | I1 | I2 | | | | |
| I0 | F0 | F1 | F2 | B0 | B1 | | |
| I0 | F0 | F1 | F2 | B0 | | | |
| I0 | F0 | F1 | F2 | | | | |
| I0 | F0 | I1 | I2 | B0 | B1 | | |
| I0 | F0 | I1 | I2 | B0 | | | |
| I0 | F0 | I1 | I2 | | | | |
| F0 | F1 | F2 | F3 | B0 | B1 | | |
| F0 | F1 | F2 | F3 | B0 | | | |

FIG. 33

| F0 | F1 | F2 | F3 |    |    |  |  |
|----|----|----|----|----|----|--|--|
| I0 | I1 | I2 | I3 | B0 | B1 |  |  |
| I0 | I1 | I2 | I3 | B0 |    |  |  |
| I0 | I1 | I2 | I3 |    |    |  |  |
| I0 | F0 | I1 | B0 | B1 |    |  |  |
| I0 | F0 | I1 | B0 |    |    |  |  |
| I0 | F0 | I1 |    |    |    |  |  |
| I0 | F0 | F1 | B0 | B1 |    |  |  |
| I0 | F0 | F1 | B0 |    |    |  |  |
| I0 | F0 | F1 |    |    |    |  |  |
| F0 | F1 | F2 | B0 | B1 |    |  |  |
| F0 | F1 | F2 | B0 |    |    |  |  |
| F0 | F1 | F2 |    |    |    |  |  |
| I0 | I1 | I2 | B0 | B1 |    |  |  |
| I0 | I1 | I2 | B0 |    |    |  |  |
| I0 | I1 | I2 |    |    |    |  |  |
| I0 | F0 | B0 | B1 |    |    |  |  |
| I0 | F0 | B0 |    |    |    |  |  |
| I0 | F0 |    |    |    |    |  |  |
| F0 | F1 | B0 | B1 |    |    |  |  |
| F0 | F1 | B0 |    |    |    |  |  |
| F0 | F1 |    |    |    |    |  |  |
| I0 | I1 | B0 | B1 |    |    |  |  |
| I0 | I1 | B0 |    |    |    |  |  |
| I0 | I1 |    |    |    |    |  |  |
| I0 | B0 | B1 |    |    |    |  |  |
| I0 | B0 |    |    |    |    |  |  |
| I0 |    |    |    |    |    |  |  |
| F0 | B0 | B1 |    |    |    |  |  |
| F0 | B0 |    |    |    |    |  |  |
| F0 |    |    |    |    |    |  |  |
| B0 | B1 |    |    |    |    |  |  |
| B0 |    |    |    |    |    |  |  |

FIG.34

| | | | | |
|---|---|---|---|---|
| 0x00000000 | ADD | FADD | ADD | FADD | ← VLIW INSTRUCTION 1
| 0x00000010 | ADD | FADD | ADD | FADD |
| 0x00000020 | BASIC INSTRUCTION 0 | BASIC INSTRUCTION 1 | BASIC INSTRUCTION 2 | BASIC INSTRUCTION 3 | ← VLIW INSTRUCTION 2
| 0x00000030 | BASIC INSTRUCTION 4 | BASIC INSTRUCTION 5 | BASIC INSTRUCTION 0 | BASIC INSTRUCTION 1 | ← VLIW INSTRUCTION 3
| 0x00000040 | BASIC INSTRUCTION 2 | BASIC INSTRUCTION 0 | | | ← VLIW INSTRUCTION 4

FIG. 35

INSTRUCTION REGISTER 122

| ADD | FADD | ADD | FADD | ADD | FADD | ADD | FADD |
|-----|------|-----|------|-----|------|-----|------|

VLIW 1

TIME 1

FIG.36

| INSTRUCTION OPERATION CODE | FUNCTIONAL UNIT CLASSIFICATION | FUNCTIONAL UNIT NUMBER OF EACH FUNCTIONAL UNIT CLASSIFICATION | | | |
|---|---|---|---|---|---|
| | | 0 | 1 | 2 | 3 |
| ADD | IU | ○ | ○ | ○ | ○ |
| FADD | FU | ○ | ○ | ○ | ○ |
| BRA | BU | ○ | ○ | — | — |

IU : EXECUTABLE BY INTEGER UNIT

FU : EXECUTABLE BY FLOATING UNIT

BU : EXECUTABLE BY BRANCH UNIT

○ : ASSIGNABLE

— : NOT ASSIGNABLE

FIG.37

| LOGICAL INSTRUCTION SLOT | ASSIGNABLE FUNCTIONAL UNIT CLASSIFICATION | | | FUNCTIONAL UNIT NUMBER OF EACH FUNCTIONAL UNIT CLASSIFICATION | | | |
|---|---|---|---|---|---|---|---|
| | IU | FU | BU | 0 | 1 | 2 | 3 |
| 0 | ○ | — | — | ○ | — | — | — |
| 1 | — | ○ | — | ○ | — | — | — |
| 2 | ○ | — | — | — | ○ | — | — |
| 3 | — | ○ | — | — | ○ | — | — |
| 4 | ○ | — | — | — | — | ○ | — |
| 5 | — | ○ | — | — | — | ○ | — |
| 6 | ○ | — | — | — | — | — | ○ |
| 7 | — | ○ | — | — | — | — | ○ |
| 8 | — | — | ○ | ○ | — | — | — |
| 9 | — | — | ○ | — | ○ | — | — |

○ : ASSIGNABLE

— : NOT ASSIGNABLE

FIG.38

| INSTRUCTION OPERATION CODE | INSTRUCTION CATEGORY |
|---|---|
| ADD | I_1 |
| FADD | F_1 |
| BRA | B_1 |

I_1 : INTEGER CATEGORY 1

F_1 : FLOATING CATEGORY 1

B_1 : BRANCH CATEGORY 1

FIG.39

| INSTRUCTION CATEGORY | FUNCTIONAL UNIT CLASSIFICATION | FUNCTIONAL UNIT NUMBER OF EACH FUNCTIONAL UNIT CLASSIFICATION | | | |
|---|---|---|---|---|---|
| | | 0 | 1 | 2 | 3 |
| I_1 | IU | ◯ | ◯ | — | — |
| F_1 | FU | ◯ | ◯ | — | — |
| B_1 | BU | ◯ | ◯ | — | — |

◯ : EXECUTABLE  — : NOT EXECUTABLE

FIG.40

| LOGICAL INSTRUCTION SLOT | ASSIGNABLE FUNCTIONAL UNIT CLASSIFICATION | | | FUNCTIONAL UNIT NUMBER OF EACH FUNCTIONAL UNIT CLASSIFICATION | | | |
|---|---|---|---|---|---|---|---|
| | IU | FU | BU | 0 | 1 | 2 | 3 |
| 0 | ◯ | — | — | ◯ | — | — | — |
| 1 | — | ◯ | — | ◯ | — | — | — |
| 2 | ◯ | — | — | — | ◯ | — | — |
| 3 | — | ◯ | — | — | ◯ | — | — |
| 4 | — | — | ◯ | ◯ | — | — | — |
| 5 | — | — | ◯ | — | ◯ | — | — |

◯ : EXECUTABLE  — : NOT EXECUTABLE

FIG.41

| INSTRUCTION OPERATION CODE | INSTRUCTION CATEGORY |
|---|---|
| ADD | I_1 |
| FADD | F_1 |
| BRA | B_1 |

I_1 : INTEGER CATEGORY 1

F_1 : FLOATING CATEGORY 1

B_1 : BRANCH CATEGORY 1

FIG.42

| INSTRUCTION CATEGORY | FUNCTIONAL UNIT CLASSIFICATION | FUNCTIONAL UNIT NUMBER OF EACH FUNCTIONAL UNIT | | | |
|---|---|---|---|---|---|
| | | 0 | 1 | 2 | 3 |
| I_1 | IU | ○ | ○ | — | — |
| F_1 | FU | ○ | ○ | — | — |
| B_1 | BU | ○ | ○ | — | — |

○ : ASSIGNABLE

— : NOT ASSIGNABLE

FIG.43

| LOGICAL INSTRUCTION UNIT | ASSIGNABLE FUNCTIONAL UNIT CLASSIFICATION | | | FUNCTIONAL UNIT NUMBER OF EACH FUNCTIONAL CLASSIFICATION | | | |
|---|---|---|---|---|---|---|---|
| | IU | FU | BU | 0 | 1 | 2 | 3 |
| 0 | ○ | — | — | ○ | — | — | — |
| 1 | — | ○ | — | ○ | — | — | — |
| 2 | ○ | — | — | — | ○ | — | — |
| 3 | — | ○ | — | — | ○ | — | — |
| 4 | ○ | — | — | — | — | ○ | — |
| 5 | — | ○ | — | — | — | ○ | — |
| 6 | ○ | — | — | — | — | — | ○ |
| 7 | — | ○ | — | — | — | — | ○ |
| 8 | — | — | ○ | ○ | — | — | — |
| 9 | — | — | ○ | — | ○ | — | — |

○ : ASSIGNABLE

— : NOT ASSIGNABLE

INSTRUCTION PROCESSING METHOD FOR VERIFYING BASIC INSTRUCTION ARRANGEMENT IN VLIW INSTRUCTION FOR VARIABLE LENGTH VLIW PROCESSOR

BACKGROUND OF THE INVENTION

1. Field of the Invention

Recent improvements in processing capacity of computer systems are mainly realized by improvement in processing capacity of processors, Central Processing Units (CPUs). The processing capacity of the processors is improved by increasing Instruction Level Parallelism (ILP), for example. Technologies such as Super-Scalar Architecture and Very Long Instruction Word Architecture (VLIW) are known as a method to increase the ILP.

Various microprocessors are provided in electronic devices such as cellular phones, printers, and digital televisions. Those devices are called as Embedded Application device, and those microprocessors are called as Embedded Processors.

Recent demands for high-performance embedded application devices require performance of embedded processors to be improved year by year. Some of the embedded processors have been improving their performance by increasing ILP.

In a development of an embedded application device, however, both cost and power consumption of the device must be considered at a high priority. A processor designed by the super scalar architecture, compared with a processor designed by VLIW architecture, usually requires larger chip size and consumes more electric power. On contrary, the processor based on VLIW requires a larger program, and consequently a larger memory device to store the program, since "no operation" instructions (NOP) must be inserted into instruction slots where no instruction is put.

Processors designed by variable length VLIW architecture have solved this problem as described in the specification filed as a Japanese patent application No. 1999-281957 dated Oct. 1, 1999.

The present invention generally relates to computer programs, and more particularly, to algorithm to verify an arrangement of basic VLIW instructions for language processing system used on such processor designed by variable length VLIW architecture.

2. Description of the Related Art

FIG. 1 shows a configuration of a conventional processor based on the very long instruction word architecture. This processor will be referred to as VLIW processor.

(Architecture)

The conventional processor shown in FIG. 1 includes a memory 10, an instruction read unit 11, instruction registers 12, integer units IU0 and IU1, floating units FU0 and FU1, branch units BU0 and BU1, a general purpose register GR, a floating register FR, and program counter PC.

The instruction read unit 11 reads a memory area storing a VLIW instruction addressed by an address stored in the program counter PC, and write the VLIW instruction to the instruction register 12. The instruction read unit 11 also increase the address stored in program counter PC by a number corresponding to a VLIW instruction.

The instruction register 12 stores the VLIW instruction written by the instruction read unit 11. The instruction register 12 provides the instruction to IU, FU, and BU as follows:

A basic instruction stored in an instruction slot 0 is provided to IU0. Basic instructions stored in an instruction slot 1, 2, 3, 4, and 5 are provided to FU0, IU1, FU2, BU0, and BU1, respectively.

IU0 and IU1 perform an integer arithmetic instruction, an integer load instruction, an integer store instruction, a floating point load instruction, a floating point store instruction, and a "no operation" instruction.

When an integer arithmetic instruction is provided, the integer units retrieve input operand data from the general purpose register GR, and store output operand data, the result of the integer arithmetic, to the general purpose register GR.

When an integer load instruction is provided, the integer units IU0 and IU1 retrieve input operand data from a register, and calculate an effective address. Then, the integer units retrieve data from a memory area corresponding to the effective address, and store the data to the general purpose register GR.

When an integer store instruction is provided, the integer units retrieve input operand data from the general purpose register GR, and calculate an effective address. Then, the integer units store "store data" to a memory area corresponding to the effective address.

When a floating point instruction is provided, the integer units retrieve input operand data from a register, and calculate an effective address. Then, the integer units retrieve data stored in a memory area corresponding to the effective address, and store the data to the floating register FR.

When a floating point store instruction is provided, the integer units retrieve input operand data from the floating register FR, and calculate an effective address. Then, the integer units store "store data" to a memory area corresponding to the effective address.

When a "no operation" instruction is provided, the integer units perform nothing.

The floating units FU0 and FU1 perform a floating point arithmetic instruction and a "no operation" instruction. When a floating point arithmetic instruction is provided, the floating units retrieve input operand data from a floating register FR, and perform floating point arithmetic. Then, the floating units store output operand data, a result of the arithmetic, to a floating register FR. When a "no operation" instruction is provided, the floating units perform nothing.

The branch units BU0 and BU1 perform an unconditional branch instruction, a conditional branch instruction, and a "no operation" instruction. When an unconditional branch instruction is provided, the branch units retrieve input operand data from registers (GR, PC), and calculate an address follow d by storing the address to a program counter PC. When a conditional branch instruction is provided, the branch units check whether a branch condition is met. If the branch condition is met, the branch units retrieve input operand data from a register (GR, PC), and calculate an address using the input operand data. The branch units further store the result, i.e., an address of a destination of the branch, in the program counter PC. When a "no operation" instruction is provided, the branch units perform nothing.

IU, FU, and BU are, hereinafter, called functional units. A functional unit performs a basic instruction provided by an instruction register.

(Operation)

Operations of a VLIW processor will be described here.

A process in which a VLIW processor shown in FIG. 1 executes a program shown in FIG. 2, for example, will be described with reference to FIG. 3. In these figures, "ADD" is an integer arithmetic instruction meaning an addition, "FADD" is a floating point arithmetic instruction meaning an addition, and "NOP" is a "no operation" instruction.

(Time 1)

(A) A VLIW instruction 1 is stored in memory area in the memory 10 as shown in FIG. 2. Using an instruction address stored in PC, the instruction read unit 11 retrieves a VLIW instruction 1 from the memory 10, and stores the VLIW instruction 1 to the instruction register. Basic instructions included in the VLIW instruction 1 are stored in the instruction slots indicated as Time 1 as shown in FIG. 3.

(B) The functional units execute the instructions provided. An "ADD" instruction stored in the instruction slot 0 is executed by IU0. A "FADD" instruction stored in the instruction slot 1 is executed by FU0. An "ADD" instruction stored in the instruction slot 2 is executed by IU1. A "FADD" instruction stored in the instruction slot 3 is executed by FU1. A "NOP" instruction stored in the instruction slot 4 is executed by BU0. Another "NOP" instruction stored in the instruction slot 5 is executed by BU1.

The execution of the VLIW instruction 1 finishes when a last basic instruction is executed by an instruction unit.

(Time 2)

(A) A VLIW instruction 2 is stored in memory area in the memory 10 as shown in FIG. 2. Using an instruction address stored in PC, the instruction read unit 11 retrieves the VLIW instruction 2 from the memory 10, and stores the VLIW instruction 2 to the instruction register. Basic instructions included in the VLIW instruction 2 are stored in the instruction slots indicated as Time 2 as shown in FIG. 3.

(B) The functional units execute the instructions provided. An "ADD" instruction stored in the instruction slot 0 is executed by IU0. A "NOP" instruction stored in the instruction slot 1 is executed by FU0. A "NOP" instruction stored in the instruction slot 2 is executed by IU1. A "NOP" instruction stored in the instruction slot 3 is executed by FU1. A "NOP" instruction stored in the instruction slot 4 is executed by BU0. Another "NOP" instruction stored in the instruction slot 5 is executed by BU1.

The execution of the VLIW instruction 2 finishes when a last basic instruction is executed by an instruction unit.

(Time 3)

(A) A VLIW instruction 3 is stored in memory area in the memory 10 as shown in FIG. 2. Using an instruction address stored in PC, the instruction read unit 11 retrieves the VLIW instruction 3 from the memory 10, and stores the VLIW instruction 3 to the instruction register. Basic instructions included in the VLIW instruction 3 are stored in the instruction slots indicated as Time 3 as shown in FIG. 3.

(B) The functional units execute the instructions provided. A "NOP" instruction stored in the instruction slot 0 is executed by IU0. A "FADD" instruction stored in the instruction slot 1 is executed by FU0. A "NOP" instruction stored in the instruction slot 2 is executed by IU1. A "NOP" instruction stored in the instruction slot 3 is executed by FU1. A "NOP" instruction stored in the instruction slot 4 is executed by BU0. Another "NOP" instruction stored in the instruction slot 5 is executed by BU1.

The end of the execution of the VLIW instruction 3 means that all basic instructions are executed by instruction units.

In case of a VLIW processor, an instruction slot in the instruction register 12 where a VLIW instruction retrieved by the instruction readout unit 11 is stored and a functional unit in the instruction execution unit which executes the VLIW instruction corresponds 1-to-1. In other words, since an integer arithmetic instruction, an integer load instruction, an integer store instruction, a floating point load instruction, and a floating point store instruction are executed only by the integer units IU0 and IU1, these instructions must be stored in either the instruction slot 0 or the instruction slot 1.

Since a floating point arithmetic instruction is executed only by FU0 or FU1, this instruction must be stored in either the instruction slot 1 or the instruction slot 3.

Because a conditional branch instruction and an unconditional branch instruction are executed only by the branch units BU0 or BU1, these instructions must be stored in the instruction slot 4 or the instruction slot 5. Due to this constraint, a language processing system for a VLIW processor must verify the correspondence between a basic instruction and an instruction slot. A language processing system, an assembler and a compiler, for a VLIW processor includes a VLIW verification step which verifies whether an arrangement of basic instructions is executable by the VLIW processor. Only executable VLIW instructions are stored in the memory 10.

(Assembler)

FIG. 4 is a flow chart of an assembler for a VLIW processor as an example of prior art. The assembler includes a word analysis step S11, an instruction code generation step S12, a VLIW verification step S13, and an object generation step S14.

In the word analysis step S11, source code text is retrieved, from the beginning sequentially, from a source code file of an assembler program, and words and phrases in the retrieved source code text are analyzed. In the instruction code generation step S12, analyzed words and phrases are converted into instruction codes. In the VLIW verification step S13, it is verified whether a VLIW instruction can be provided through an instruction issuance unit to an instruction execution unit of the processor. In the object generation step S14, issuable VLIW instructions are converted into an object format, and written out to an object program file.

FIG. 5 is a flow chart of the VLIW verification step S13. The VLIW verification step S13 includes an instruction slot configuration verification step S13-1 and a register conflict verification step S13-2.

The instruction slot configuration verification step S13-1 verifies whether each basic instruction of a VLIW instruction is assigned to an instruction slot which can execute the basic instruction. FIG. 6 is a flow chart of the instruction slot arrangement verification step S13-1.

The register conflict verification step S13-2 verifies whether two or more basic instructions of a VLIW instruction store data in the same register at the same time. An algorithm used in the instruction slot configuration verification step S13-1 which verifies whether basic instructions of a VLIW instruction are issuable is as follows.

In the step S22, basic instructions are taken out from the VLIW instruction first. In the next step S23, an instruction slot at which a basic instruction is assigned is identified. In the next step S24, an instruction slot at which the basic instruction is executable is checked with reference to an assignable instruction slot table. In the step S25, whether the instruction slot at which the basic instruction is assigned (S23) is one of the instruction slots at which the basic instruction is executable (S24) is checked. The steps S22-S27 are repeated until all instruction slots are checked (Step S21).

FIG. 7 is the assignable instruction slot table which is referred to at the step S24. The assignable instruction slot table indicates, for each basic instruction available for a VLIW processor, which instruction slot is assignable and which is not.

(Compiler)

FIG. 8 is a flow chart of a compiler for a VLIW processor as an example of prior art. As shown in the flow chart, the compiler includes a word analysis step S31, a syntax analysis step S32, a semantic analysis step S33, a VLIW formation step S34, and an assembly language description output step S35.

The word analysis step S31 reads out source code text, from the beginning sequentially, out of a source code file written in a high level language, and analyzes words and phrases of the source code text. The syntax analysis step S32 analyzes a logical structure of the program in accordance with syntax rules. The semantic analysis step S33 analyzes the meaning of each component of the program, and converts the source code to an intermediate language codes. The VLIW formation step S34 converts the intermediate language codes into a VLIW instruction, and is identical to a VLIW verification step S13 of the assembler. The assembly language output step S35 outputs the VLIW instructions expressed in the assembly language.

FIG. 9 is a flow chart of the VLIW formation step S34 of the compiler. The VLIW formation step 34 uses the following algorithm. The step S41 checks whether a basic instruction can be taken out of an intermediate language expression. If YES, a step S42 follows, and if NO, a step S48 is performed. In the step S42, a basic instruction is taken out. A step S43 checks whether the basic instruction can be assigned to an instruction assignment table. If YES, a step S45 follows, and if NO, a step S46 is performed.

The step S45 assigns the basic instruction to the instruction assignment table, and a step S42 follows. If the step S44 is NO, the step S46 outputs a set of basic instructions stored in the instruction assignment table as a VLIW instruction. A step S47 clears the instruction assignment table. Then, the step 43 follows.

If the step 41 is NO, a set of basic instructions stored in the instruction assignment table is output as a VLIW instruction.

In case of an embedded processor based on a variable length very long instruction word architecture described in a Japanese patent application 1999-281957 dated Oct. 1, 1999, instruction slots, which is an element of a VLIW instruction, and functional units have either a 1-to-many relationship or a many-to-many relationship. Accordingly, a language processing system must verify whether a set of basic instructions forming a VLIW instruction is executable by the processor.

Since embedded processors can be used in a wide range of applications, performance requirements for an embedded processor vary in a wide range. The variable length VLIW architecture processors described in the Japanese patent application mentioned above realizes processors for which different length instructions can be used, and satisfies such requirements. Short instruction length processors are applicable to low performance applications, and long instruction length processors are applicable to high performance applications. It should be noted, however, that making a different language processing system which supports a processor having a different instruction length is not economical.

SUMMARY OF THE INVENTION

Accordingly, it is a general object of the present invention to provide a novel and useful instruction processing methods wherein the foregoing problems are eliminated.

Another and more specific object of the present invention is to provide instruction processing methods suitable for language processing systems for processors designed on the variable length very long instruction word architecture.

In order to achieve the abovementioned objects according to the present invention, a method for instruction processing, includes a first step of identifying a classification of a functional unit which can execute a basic instruction, a second step of determining whether said basic instruction can be assigned to a logical instruction slot through checking a relationship between said classification of said functional unit and said logical instruction slot, and a third step of assigning, to an instruction slot, said basic instruction determined to be assignable to said logical instruction slot.

The logical instruction slot is an imaginary instruction slot on the assumption that there exists a functional unit corresponding to each instruction slot (hereinafter referred to as a "instruction slot" or a "physical instruction slot") included in the processor. A basic instruction assignable to a logical instruction slot is also assignable to an instruction slot. By checking a relationship between the assignable basic instruction and other basic instructions assigned to the logical instruction slot, an arrangement of basic instructions complying with certain restrictions can be generated. If no constraint, among basic instructions of the same classification, on the relationship between the assignable basic instruction and other basic instructions assigned to the logical instruction slot is required, it is not necessary to check whether a basic instruction can be assigned to a logical instruction unit. A basic instruction assignable to a physical instruction slot is issuable as a part of variable length VLIW instruction.

The present invention also includes a method for instruction processing, including a first step of identifying an instruction category of a basic instruction, a second step of identifying a classification of a functional unit which can execute said instruction category, a third step of determining whether said basic instruction can be assigned to a logical instruction slot through checking a relationship between said classification of said functional unit and said logical instruction slot, and a fourth step of assigning, to an instruction slot, said basic instruction determined to be assignable to said logical instruction slot.

An instruction category indicates a category of a basic instruction. A basic instruction classification can be divided into multiple instruction categories. Each instruction category can be assigned to a functional unit. The instruction category is useful in such a case that an integer arithmetic instruction is executable by any integer units, but another integer arithmetic instruction is executable by only a specific integer unit, for example. Since a functional unit can be identified using an instruction category, a basic instruction can be arranged based on the instruction category. If necessary, a relationship between the assignable basic instruction and other basic instructions to be assigned to a logical instruction slot is checked.

Other objects, features, and advantages of the present invention will be more apparent from the following detailed description when read in conjunction with the accompanying drawings.

BRIEF DESCRIPTION OF THE DRAWINGS

FIG. 2 is a drawing showing an example of a VLIW instruction arrangement in a memory shown in FIG. 1;

FIG. 7 is an example of an assignable instruction slot table;

FIG. 11 is a table of basic instruction arrangements executable by a variable length VLIW processor shown in FIG. 10;

FIG. 12 is a drawing showing an example of a VLIW instruction arrangement in a memory shown in FIG. 10;

FIG. 13 is a drawing showing an example of VLIW instructions stored in an instruction register shown in FIG. 10;

FIG. 18 is an example of an instruction classification table;

FIG. 19 is an example of an instruction slot table;

FIG. 20 is an example of an instruction assignment table;

FIG. 21 is an example of a functional unit table;

FIG. 23 is an instruction classification table used in the first configuration of a variable length formation step shown in FIG. 16;

FIG. 24 is an instruction slot table used in the first configuration of a variable length formation step shown in FIG. 16;

FIG. 25 is an example of an instruction classification table used in the second algorithm for verifying a basic instruction arrangement of a variable length VLIW instruction;

FIG. 26 is an example of an instruction category table used in the second algorithm for verifying a basic instruction arrangement of a variable length VLIW instruction;

FIG. 27 is an example of an instruction slot table used in the second algorithm for verifying a basic instruction arrangement of a variable length VLIW instruction;

FIG. 32 is the first part of a table of basic instruction arrangements executable by a variable length VLIW processor shown in FIG. 31;

FIG. 33 is the second part of the table of basic instruction arrangements executable by a variable length VLIW processor shown in FIG. 31;

FIG. 34 is a drawing showing an example of VLIW instruction arrangements in the memory shown in FIG. 31;

FIG. 35 is a drawing showing an example of an VLIW instruction stored in an instruction register shown in FIG. 31;

FIG. 36 is an instruction table used in the second configuration shown in FIG. 31;

FIG. 37 is an instruction slot table used in the second configuration shown in FIG. 31;

FIG. 38 is an instruction classification table used in the third configuration of a variable length VLIW processor;

FIG. 39 is an instruction category table used in the third configuration of a variable length VLIW processor;

FIG. 40 is an instruction slot table used in the third configuration of a variable length VLIW processor;

FIG. 41 is an instruction classification table used in the fourth configuration of a variable length VLIW processor;

FIG. 42 is an instruction category table used in the fourth configuration of a variable length VLIW processor; and FIG. 43 is an instruction slot table used in the fourth configuration of a variable length VLIW processor.

DETAIL DESCRIPTION OF THE PREFERRED EMBODIMENTS

For ease of description, the first preferred embodiment of a variable length VLIW processor having variable length VLIW architecture will be described first as an example of a processor on which variable length instructions are processed. A description of a preferred embodiment of the present invention applicable to a language processing system for the variable length VLIW processor will be given next. Then, other embodiments of a variable length VLIW processor will be described.

<First Embodiment of Variable Length VLIW Processor>

Figure 10:
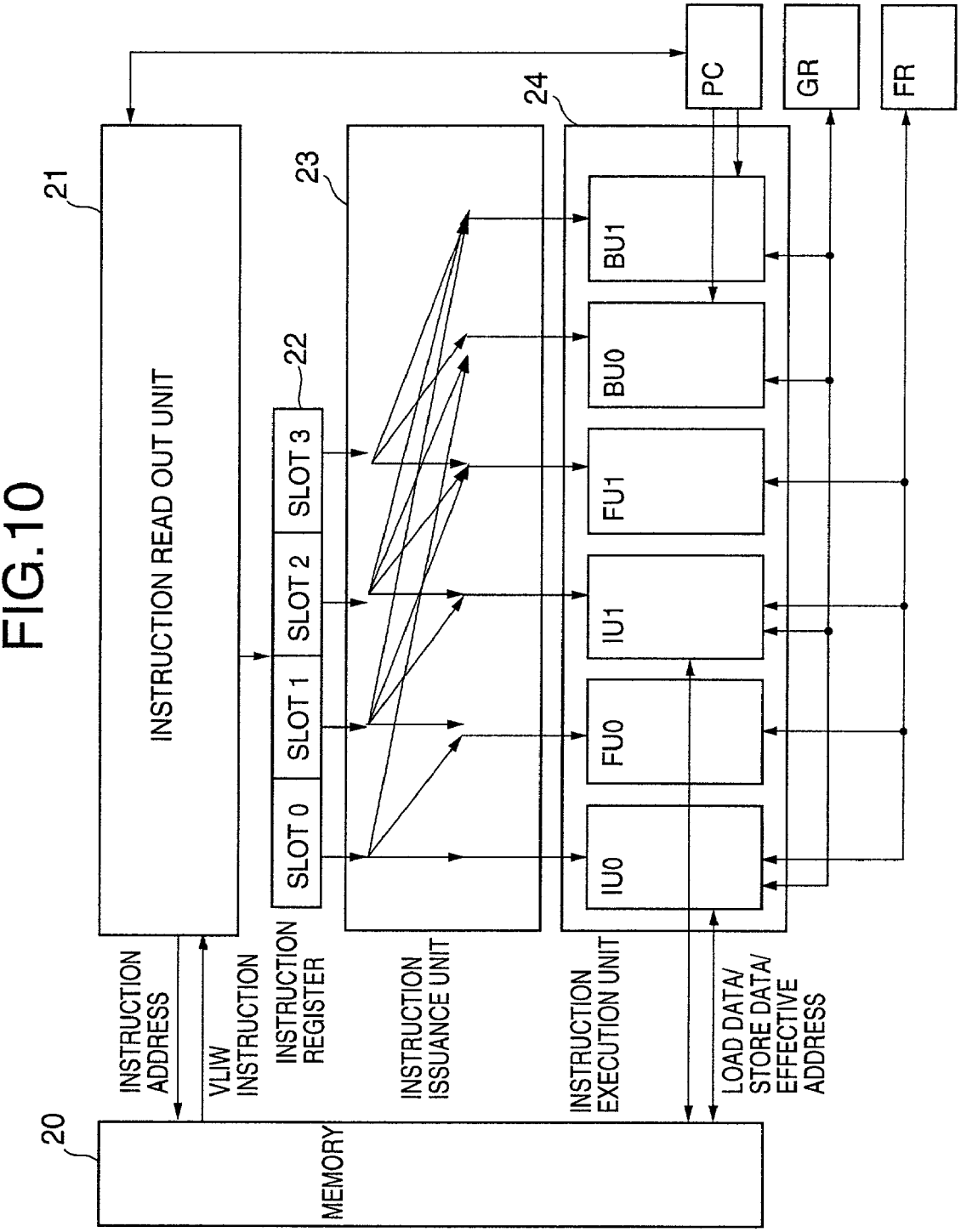
FIG. 10 is a block diagram of the first configuration of a variable length VLIW processor.

FIG. 10 is a block diagram of the first embodiment of a variable length VLIW processor which can execute at most 4 instructions at a time. This processor includes a memory 20, an instruction readout unit 21, an instruction register 22, an instruction issuance unit 23, and an instruction execution unit 24. The instruction execution unit 24 includes integer units IU0 and IU1, floating point units FU0 and FU1, and branch units BU0 and BU1. This processor further includes a general purpose register GR, a floating point register FR, and a program counter PC.

It is assumed in this description that 22 sets of basic instructions listed in FIG. 11 are allowed as an arrangement of a VLIW instruction. Symbols used in FIG. 11 have the following meanings. I0 means that an executable basic instruction is provided to IU0. I1 means that an executable basic instruction is provided to IU1. F0 means an executable basic instruction is provided to FU0. F1 means that an executable basic instruction is provided to FU1. B0 means an executable basic instruction is provided to BU0. B1 means that an executable basic instruction is provided to BU1. A blank means that no instruction is provided to a corresponding instruction slot.

The instruction readout unit 21 retrieves a memory area storing a VLIW instruction addressed by an address stored in the program counter PC, and stores the VLIW instruction to the instruction register 22. The instruction readout unit 21 increases the address stored in the program counter PC by a number corresponding to a memory size of the VLIW instruction. The instruction register 22 holds the VLIW instruction stored by the instruction readout unit 21. The instruction issuance unit 23 provides the VLIW instruction retrieved from the instruction register 22 to one of corresponding functional units IU, FU, and BU. The instruction issuance unit 23 provides at most 4 basic instructions to at most 4 functional units out of 6 functional units, and the at most 4 basic instructions are executed by this VLIW processor at the same time. Basic instructions stored in each instruction slot are provided to the functional units in the following manner.

A basic instruction stored in the instruction slot 0 can be provided to IU0, FU0, and BU0. A basic instruction stored in the instruction slot 1 can be provided to FU0, IU1, FU1, BU0, and BU1. A basic instruction stored in the instruction slot 2 can be provided to IU1, FU1, BU0, and BU1. A basic instruction stored in the instruction slot 3 can be provided to FU1, BU0, and BU1. As mentioned previously, this processor accepts only arrangements of basic instructions in a VLIW instruction shown in FIG. 11.

IU0 and IU1 execute an integer arithmetic instruction, an integer load instruction, an integer store instruction, a floating point load instruction, and a floating point store instruction.

When an integer arithmetic instruction is provided, the integer units retrieve input operand data from the general purpose register GR, and store a result of integer arithmetic as output operand data to the general purpose register GR.

When an integer load instruction is provided, the integer units IU0 and IU1 retrieve input operand data from a register, and calculate an effective address. Then, the integer units retrieve data from a memory area in the memory 20 corresponding to the effective address, and store the data to the general purpose register GR.

When an integer store instruction is provided, the integer units retrieve input operand data from the general purpose register GR, and calculate an effective address. Then, the integer units store "store data" to a memory area corresponding to the effective address.

When a floating point load instruction is provided, the integer units retrieve input operand data from a register, and calculate an effective address. Then, the integer units retrieve data stored in a memory area in the memory 20 corresponding to the effective address, and store the data to the floating register FR.

When a floating point store instruction is provided, the integer units retrieve input operand data from the floating register FR, and calculate an effective address. Then, the integer units store "store data" to a memory area in the memory 20 corresponding to the effective address.

FU0 and FU1 execute a floating point arithmetic instruction.

When a floating point arithmetic instruction is provided, the floating units retrieve input operand data from a floating register FR, and perform floating point arithmetic. Then, the floating units store a result of the arithmetic operation as output operand data to the floating register FR.

BU0 and BU1 perform an unconditional branch instruction and a conditional branch instruction. When an unconditional branch instruction is provided, the branch units retrieve input operand data from registers GR and PC, and store a calculated address to a program counter PC.

When a conditional branch instruction is provided, the branch units check whether a branch condition is met. If the branch condition is met, the branch units retrieve input operand data from registers GR and PC, and store a calculated address as an address of a destination of the branch in the program counter PC.

As mentioned before, IU, FU, and BU are functional units. A functional unit performs a basic instruction provided from the instruction register. In case of a variable length VLIW processor, VLIW instructions are stored in the memory 20 as shown in FIG. 12. Each basic instruction composing a VLIW instruction is provided with a packing flag, and a packing flag of the last basic instruction in a VLIW instruction is ON. By using a packing flag, the end of an VLIW instruction, i.e., the beginning of the next VLIW instruction, can be identified.

<Operation of First Embodiment of Variable Length VLIW Processor>

The operation of the first embodiment of a variable length VLIW processor will be described.

With reference to FIG. 13A, a process in which a VLIW processor shown in FIG. 10 executes a program shown in FIG. 12 will be described. In these figures, "ADD" is an integer arithmetic instruction meaning an addition, "FADD" is a floating point arithmetic instruction meaning an addition.

(Time 1)

(A) As shown in FIG. 13, the instruction readout unit 21, with reference to an instruction address stored in the program counter PC, retrieves a VLIW instruction 1 stored in the memory 20 as shown in FIG. 12, and stores the VLIW instruction 1 to the instruction register 22. Basic instructions included in the VLIW instruction 1 are stored in the instruction register indicated as Time 1 shown in FIG. 13.

(B) The functional units execute the provided basic instructions as follows. An "ADD" stored in the instruction slot 0 is executed by IU0. A "FADD" stored in the instruction slot 1 is executed by FU0. An "ADD" stored in the instruction slot 2 is executed by IU1. A "FADD" stored in the instruction slot 3 is executed by FU1. BU0 and BU1 execute no operation because no basic instruction is provided.

When IU0, IU1, FU0, FU1 finish the execution of basic instructions, the execution of the VLIW instruction 1 finishes.

(Time 2)

(A) A VLIW instruction 2 is stored in a memory area in the memory 20 as shown in FIG. 12. Using an instruction address stored in PC, the instruction readout unit 21 retrieves the VLIW instruction 2 from the memory 20, and stores the VLIW instruction 2 to the instruction register 22. Basic instructions included in the VLIW instruction 2 are stored in the instruction slots indicated as Time 2 shown in FIG. 13.

(B) The functional units execute the provided basic instructions as follows. An "ADD" stored in the instruction slot 0 is executed by IU0. IU1, FU0, FU1, BU0, and BU1 are provided no basic instruction, and consequently execute no operation.

When IU0 finishes the execution of basic instruction, the execution of the VLIW instruction 2 finishes.

(Time 3)

(A) A VLIW instruction 3 is stored in a memory area in the memory 20 as shown in FIG. 12. Using an instruction address stored in PC, the instruction readout unit 21 retrieves the VLIW instruction 3 from the memory 20, and stores the VLIW instruction 3 to the instruction register 22. Basic instructions included in the VLIW instruction 3 are stored in the instruction register indicated as Time 3 shown in FIG. 13.

(B) The functional units execute the instructions as follows. An "FADD" stored in the instruction slot 0 is executed by FU0. No operation is executed by IU0, IU1, FU1, BU0, and BU1, since no instruction is provided to these units.

When FU0 finishes the execution of basic instruction, the execution of the VLIW instruction 3 finishes.

An arrangement of basic instructions in a VLIW instruction must be executable by the variable length VLIW processor. An assembler and a compiler must verify whether a basic instruction arrangement satisfies certain restrictions.

<Assembler of Variable Length VLIW Processor>

Figure 14:
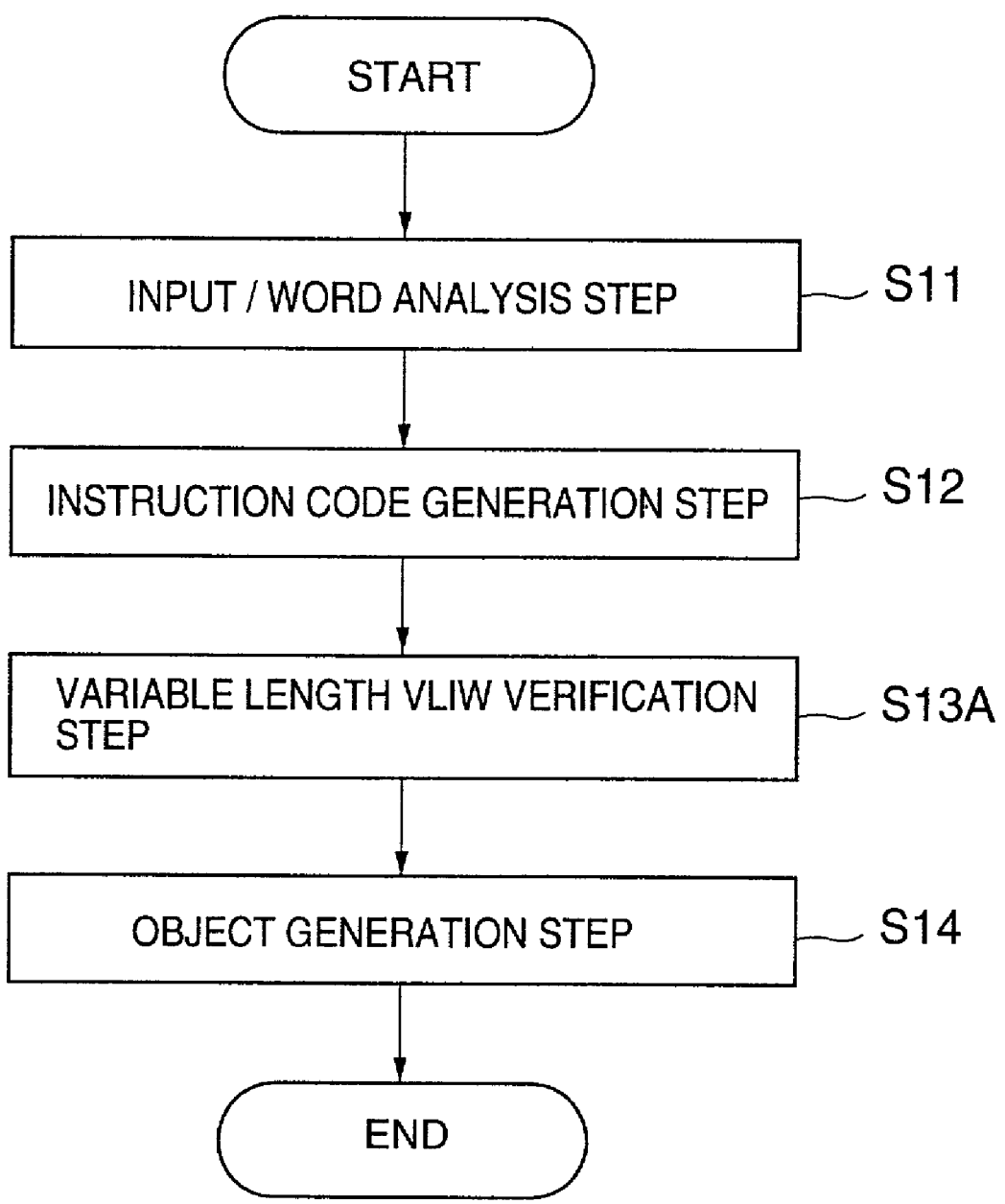
FIG. 14 is a flow chart of an assembler for a variable length VLIW processor in accordance with the first embodiment of the present invention.

FIG. 14 is a flow chart of an assembler for a variable length VLIW processor. The assembler for a variable length VLIW processor is different from an assembler for VLIW processor in that the assembler for a variable length VLIW processor includes a variable length VLIW verification step S13A as shown in FIG. 14.

Figure 1:
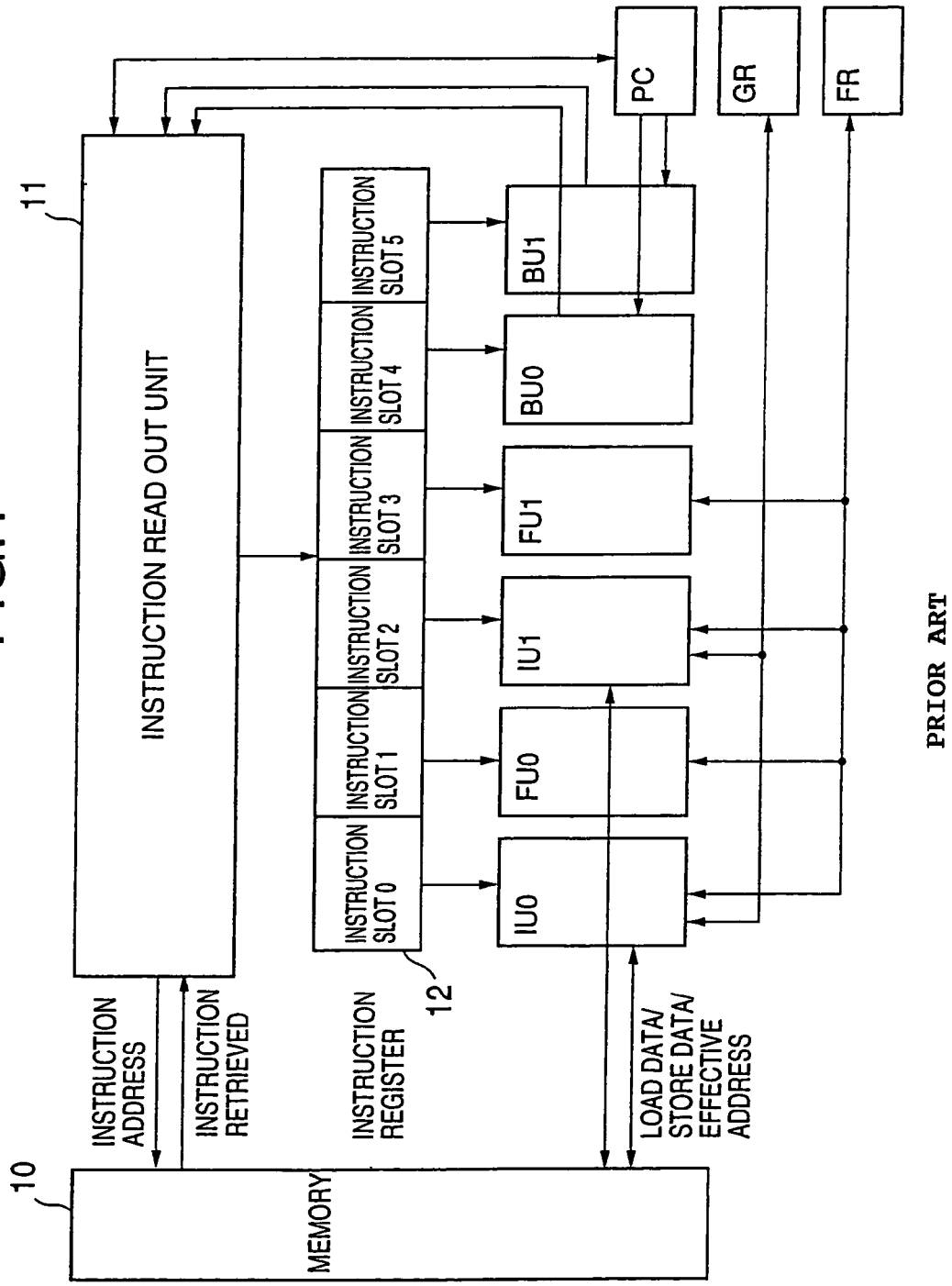
FIG. 1 is a block diagram showing a configuration of a conventional processor designed on very long instruction word architecture.
Figure 3:
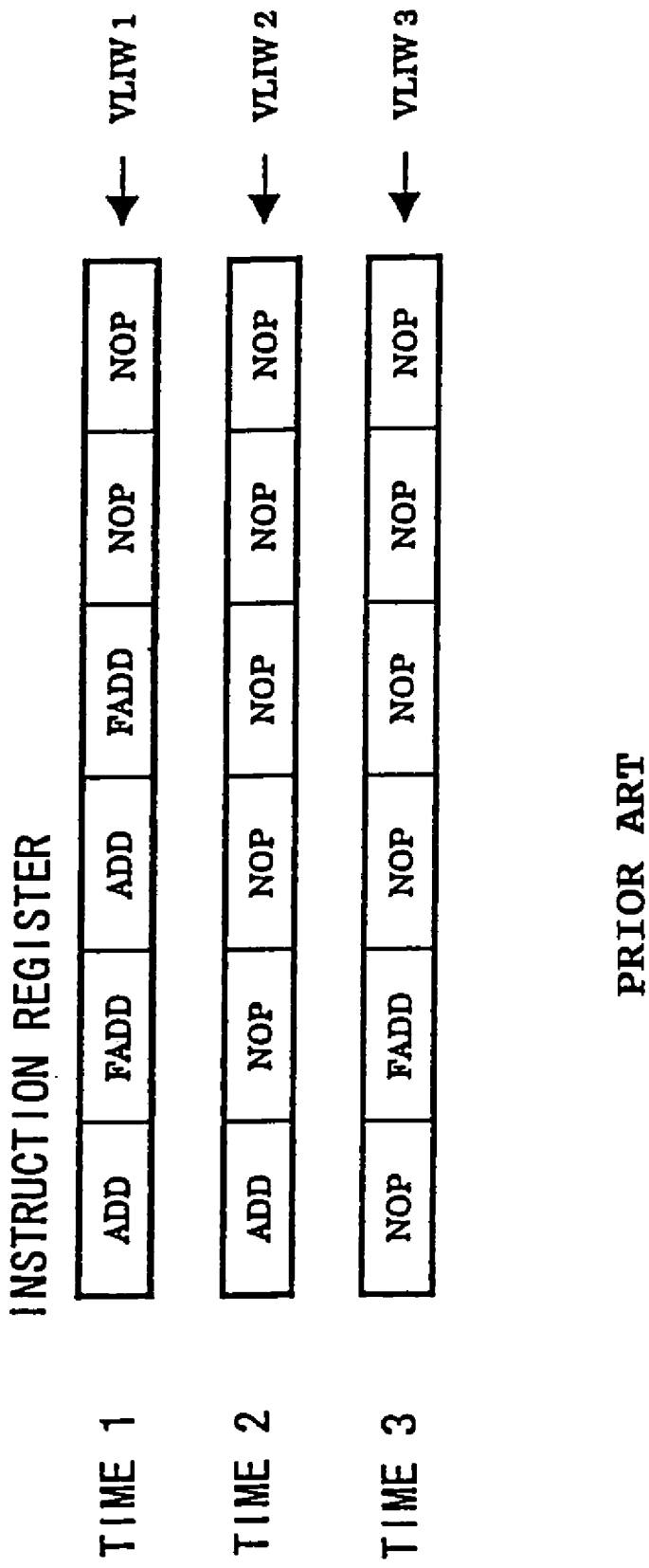
FIG. 3 is a drawing showing an example of a VLIW instruction stored in an instruction register shown in FIG. 1.
Figure 4:
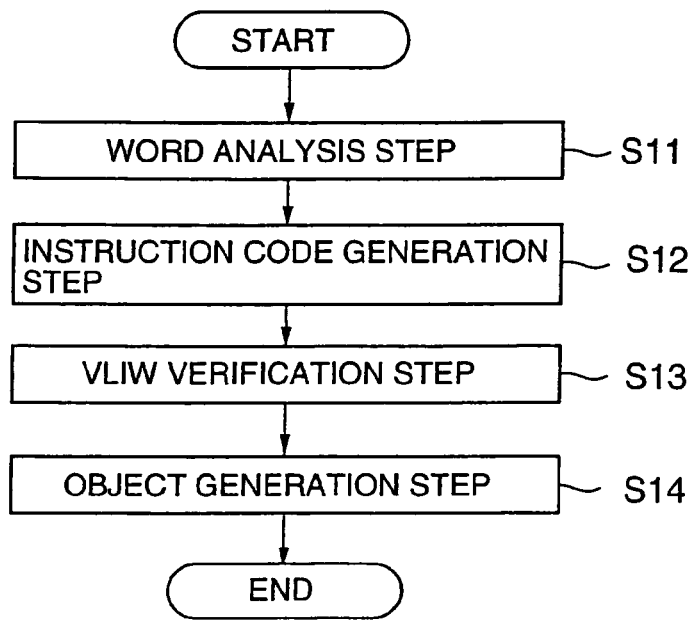
FIG. 4 is a flow chart of a conventional assembler for a VLIW processor.
Figure 5:
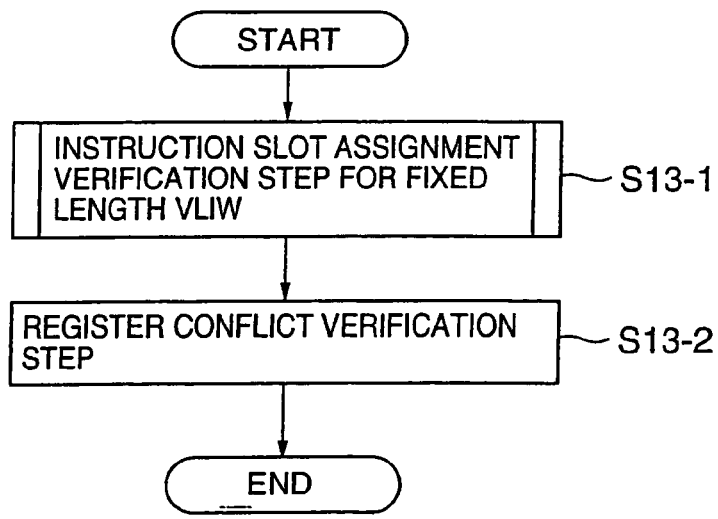
FIG. 5 is a flow chart of VLIW verification step shown in FIG. 4.
Figure 6:
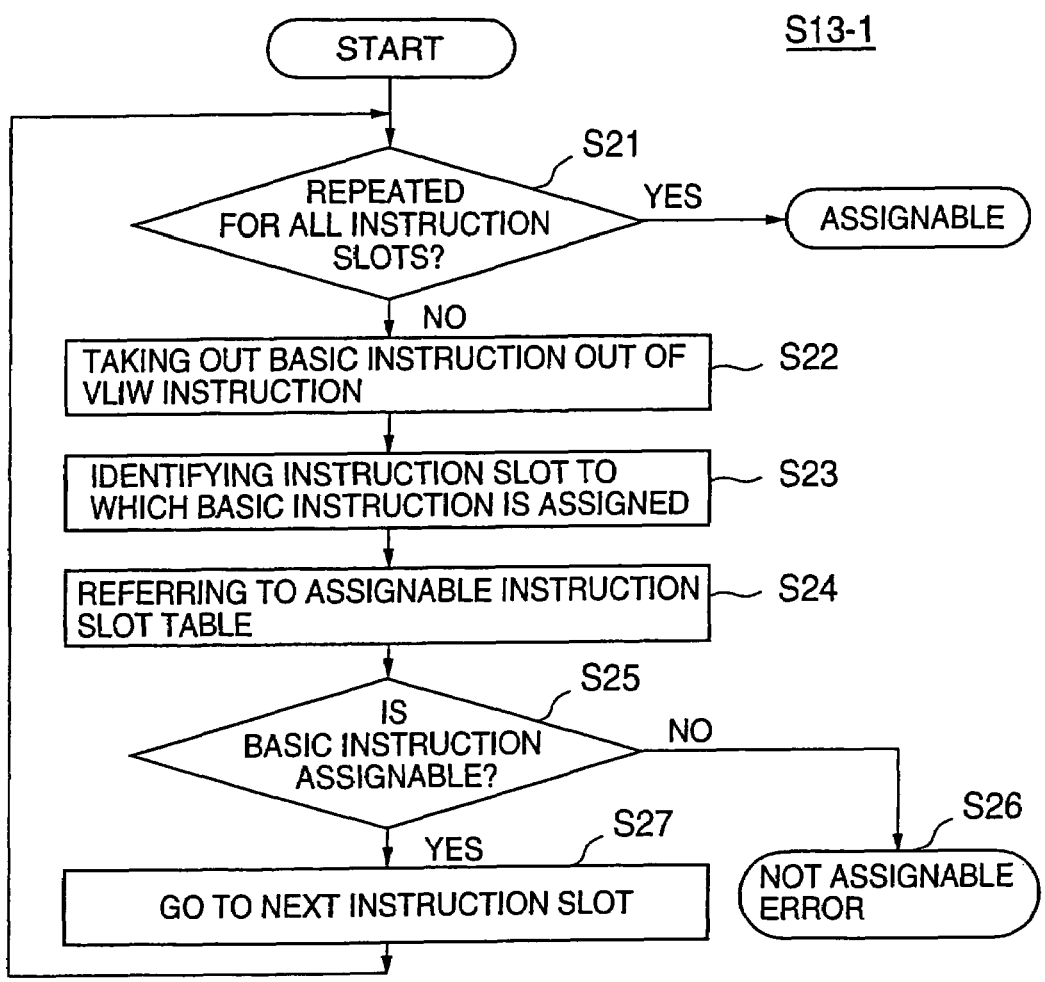
FIG. 6 is a flow chart of an instruction slot assignment verification step shown in FIG. 5.
Figure 15:
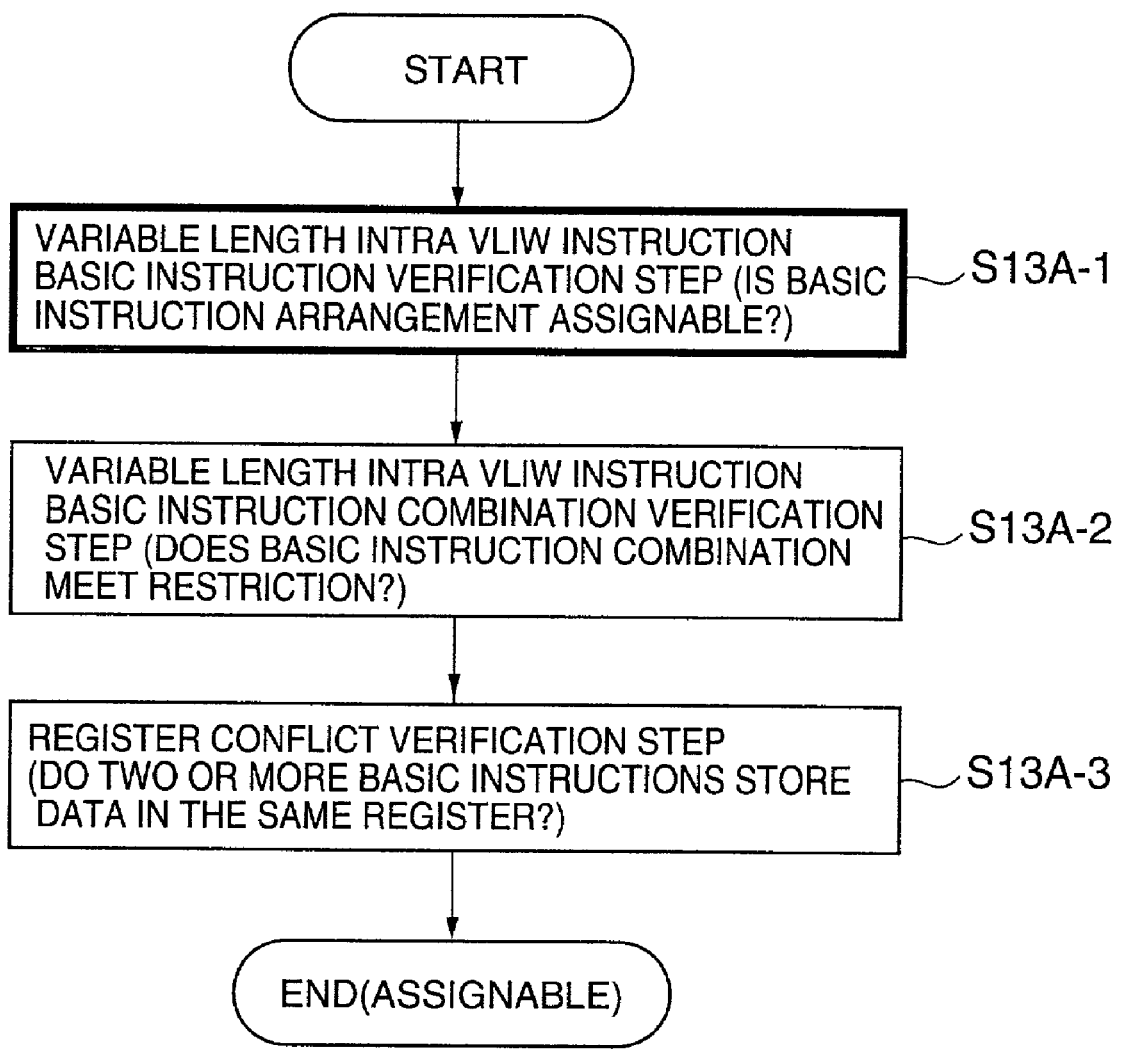
FIG. 15 is a flow chart of a variable length VLIW verification step shown in FIG. 14.

FIG. 15 is a flow chart of the variable length VLIW verification step. As shown in FIG. 15, the variable length VLIW verification step is different from a VLIW verification step of an assembler for a conventional VLIW processor in that the variable length VLIW verification step has a variable length intra VLIW instruction basic instruction verification step S13A-1. A variable length intra VLIW instruction basic instruction verification step S13-1 verifies whether a basic instruction arrangement in a variable length VLIW instruction can be issued. The flow chart shown in FIG. 15 includes an instruction combination verification step S13A-2 which checks whether a combination of basic instructions, within a VLIW instruction, satisfy a restriction. This step is optional, and can be ignored if unnecessary. A register conflict verification step S13A-3 is identical with the register conflict verification step S13-2 shown in FIG. 5, and checks whether two or more basic instructions store data in the same register at the same time.

An algorithm used in the variable length VLIW verification step S13A to verify a basic instruction arrangement of a variable length VLIW instruction will be described later.

<Compiler for Variable Length VLIW Processor>

Figure 8:
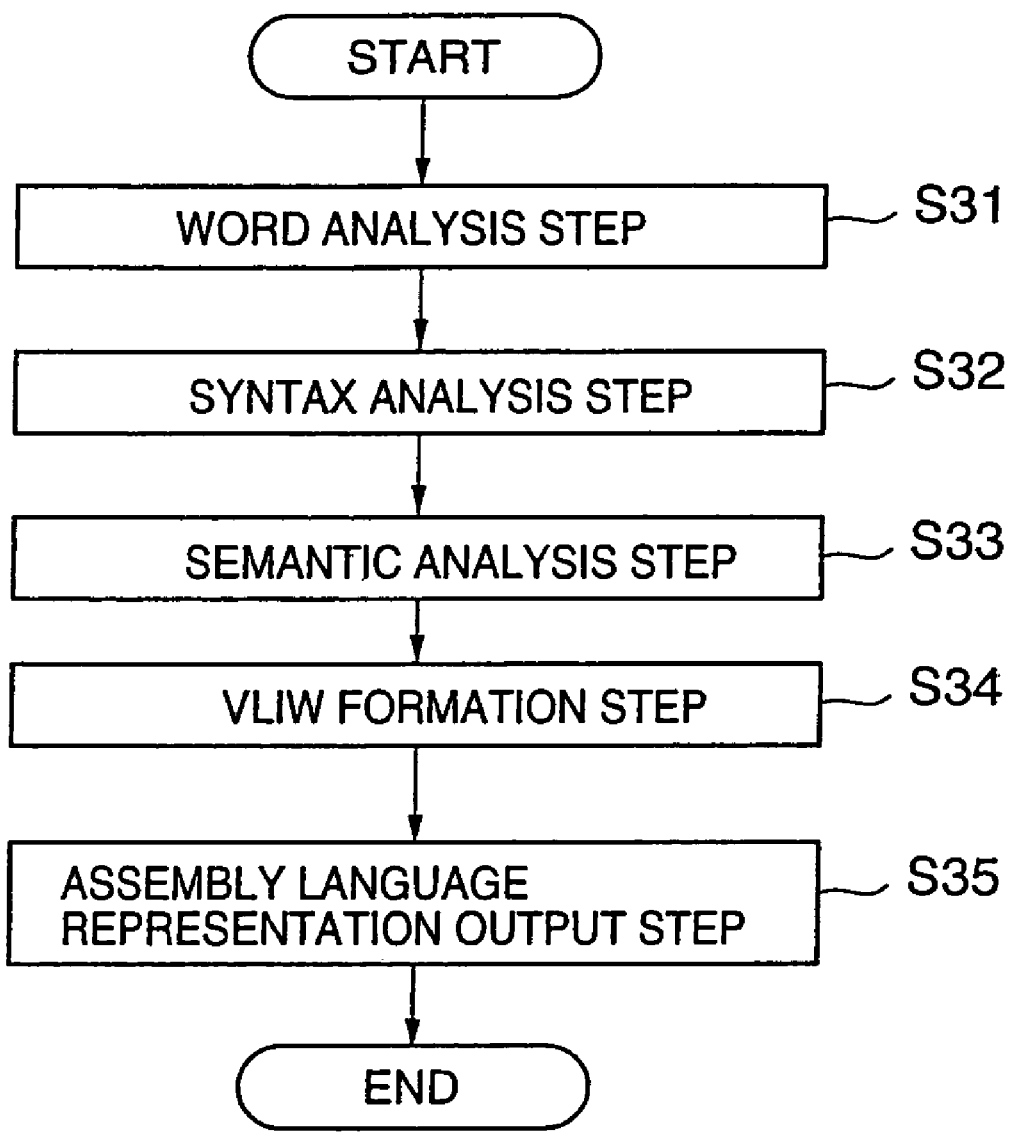
FIG. 8 is a flow chart of a conventional compiler for a VLIW processor.
Figure 9:
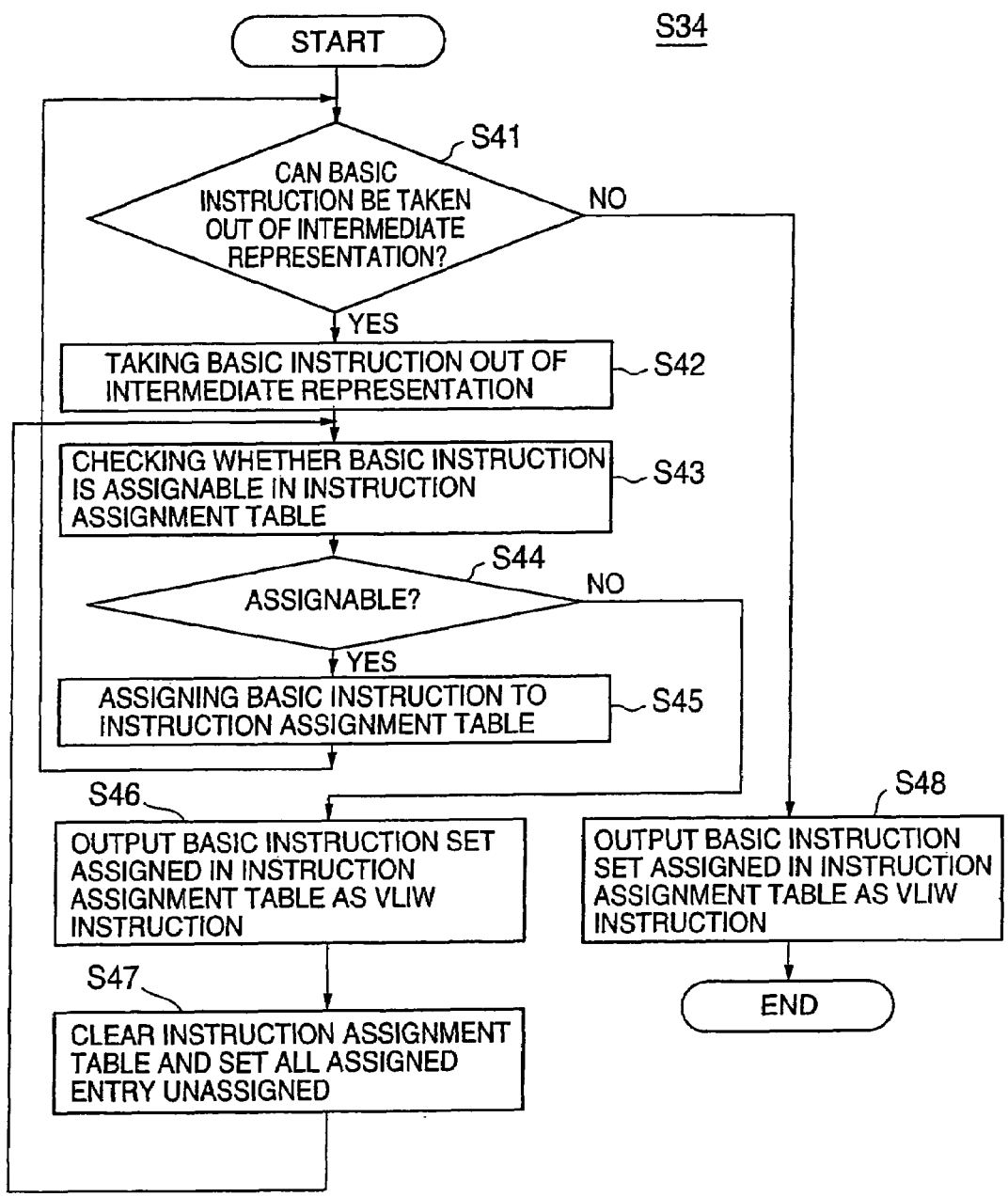
FIG. 9 is a flow chart of a VLIW formation step of the compiler.
Figure 16:
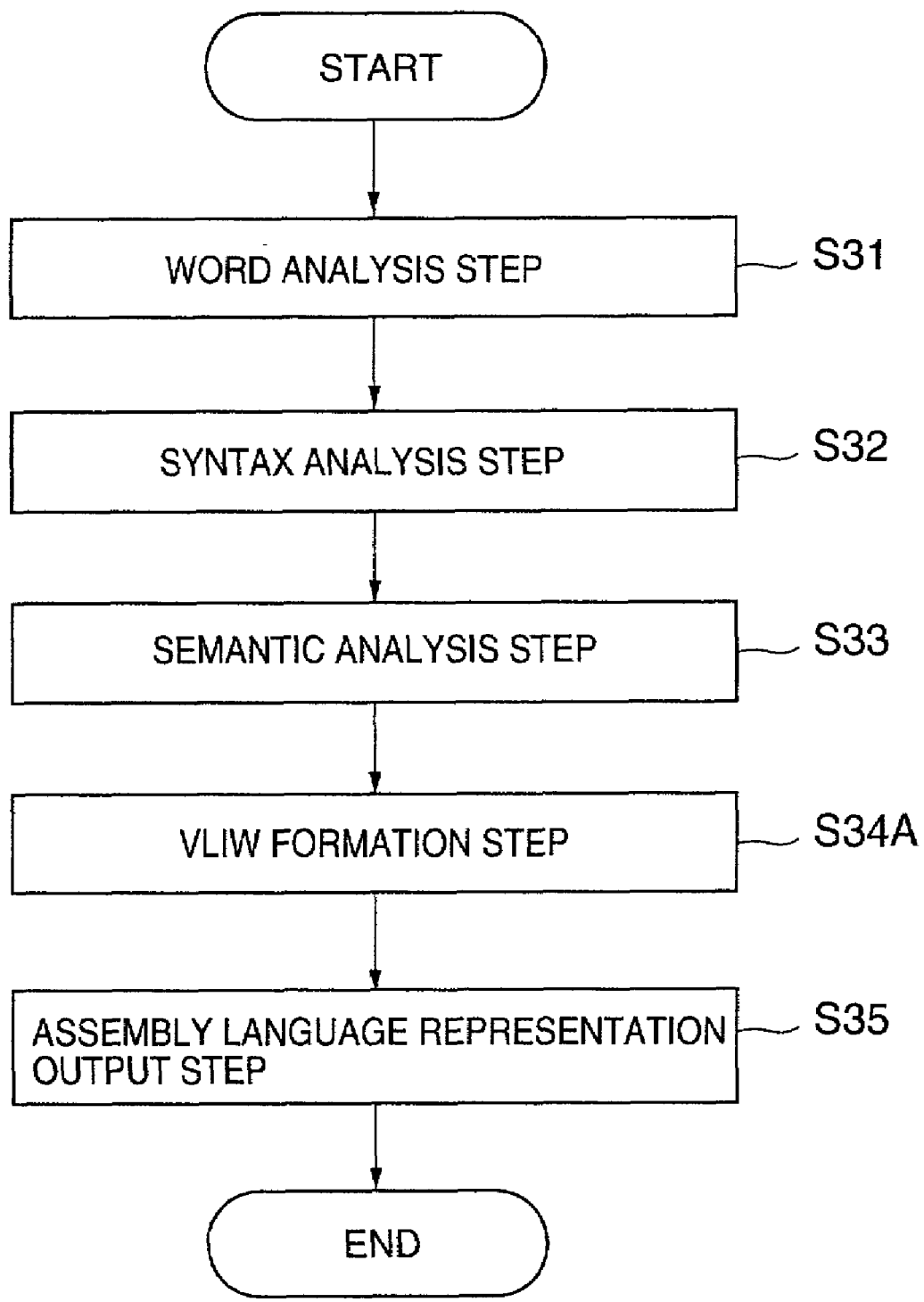
FIG. 16 is a flow chart of a compiler for a variable length VLIW processor in accordance with the first embodiment of the present invention.
Figure 17:
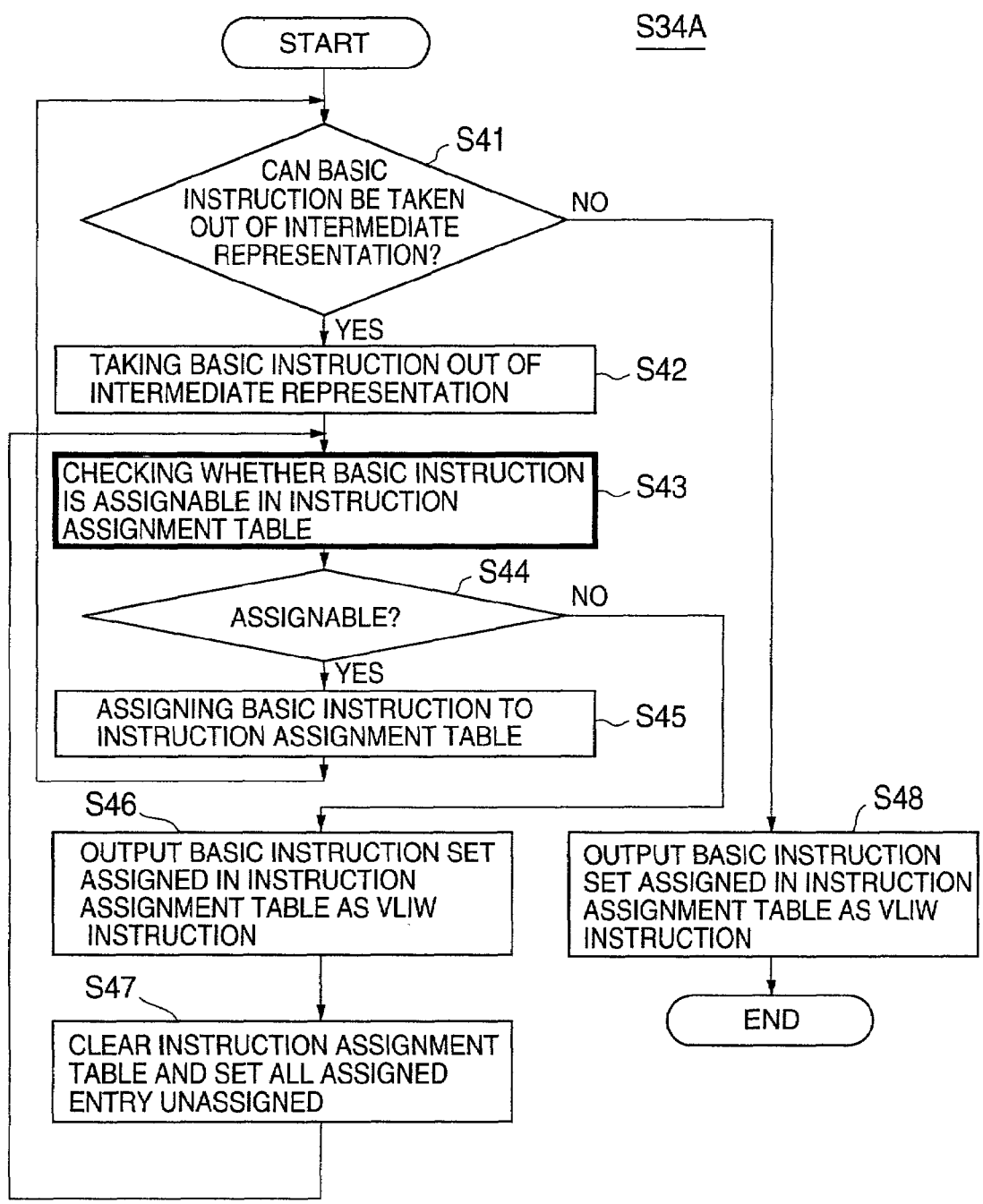
FIG. 17 is a flow chart of a VLIW formation step shown in FIG. 16.

FIG. 16 is a flow chart of a compiler for a variable length VLIW processor. FIG. 17 is a flow chart of a VLIW formation step S34A which checks whether basic instructions are assignable to an instruction assignment table. The structure of the compiler for a conventional VLIW processor shown in FIG. 8 and the structure of the compiler for a variable length VLIW processor shown in FIG. 16 are different in the VLIW formation step which verifies whether basic instructions are assignable to the instruction assignment table. An algorithm of the step S43 shown in FIG. 9 and an algorithm of a step S43 shown in FIG. 17 are different. The algorithm of the VLIW formation step S34A is identical with the algorithm of the variable length VLIW verification step S13A shown in FIG. 14, more specifically the variable length intra VLIW instruction basic instruction verification step S13A-1. This algorithm will be described in detail later.

<Algorithm to Verify Basic Instruction Arrangement of Variable Length VLIW Instruction>

The algorithm to verify a basic instruction arrangement composing a variable length VLIW instruction will be described next.

This algorithm is used in both the variable length intra VLIW instruction basic instruction verification step S13A-1 of the variable length VLIW verification step S13A shown in FIG. 14 and the VLIW formation step S34A shown in FIG. 16, and has four variations as follows.

The first algorithm includes the first step of identifying classifications of functional units which can execute basic instructions included in a variable length VLIW instruction, the second step of checking whether the basic instructions are assignable to logical instruction slots, and the third step of assigning assignable basic instructions to the instruction slots of a processor after checking a relationship between the assignable basic instruction and other basic instructions to be assigned to the logical instruction slots. The first algorithm utilizes, for example, an instruction classification table, an instruction slot table, an instruction assignment table, and a functional unit table. The first step, by looking up an instruction operation code in the instruction classification table, identifies a classification of functional units which can execute the basic instruction. The second step checks, with reference to the instruction slot table, whether the basic instruction can be assigned to a logical instruction slot. The third step, by using the instruction assignment table and the functional unit table, assign the basic instruction. The basic instructions can be assigned in a right arrangement if assigned complying with the algorithm described above.

The second algorithm is a modification of the first algorithm. The second algorithm includes the first step of identifying an instruction category of a basic instruction constituting a variable length VLIW instruction, the second step of identifying a functional unit classification which can execute the instruction category, the third step of checking whether a basic instruction can be assigned to a logical instruction slot, and the fourth step of assigning the assignable basic instruction to an instruction slot of the processor after checking a relationship between the assignable basic instruction and other basic instructions to be assigned to the instruction slots. The second algorithm utilizes, for example, an instruction classification table, an instruction slot table, an instruction assignment table, and a functional unit table, as well as an instruction category table. The first step identifies, with reference to the instruction category table, an instruction category of a basic instruction constituting a variable length VLIW instruction. The second step refers to the instruction classification table, and identifies a functional unit classification which can execute the instruction category. The third step checks, with reference to the instruction slot table, whether the basic instruction can be assigned to a logical instruction slot. The fourth step, by referring to the instruction assignment table and the functional unit table, assigns a basic instruction. Basic instructions can be assigned in a right arrangement if assigned in a manner described above.

The third algorithm includes the first step of identifying a classification of functional units which can execute a basic instruction constituting a variable length VLIW instruction, the second step of checking whether the basic instruction can be assigned to a logical instruction slot, and the third step of assigning the assignable basic instruction to an instruction slot of the processor. Unlike the first algorithm, the third algorithm does not include a step checking a relationship between the assignable basic instruction and other basic instructions to be assigned to instruction slots. This algorithm is applicable to such situations that a basic instruction can be assigned to any functional unit of the same classification. As further described later, the third algorithm utilizes an instruction classification table, an instruction slot table, and an instruction assignment table, for example. The first step, by looking up an instruction operation code in the instruction classification table, identifies a classification of functional units which can execute the basic instruction. The second step checks, with reference to the instruction slot table, whether the basic instruction can be assigned to a instruction slot. The third step, by using the instruction assignment table and the functional unit table, assigns basic instructions. The basic instructions can be assigned in a right arrangement if assigned in a manner described above.

The fourth algorithm is a variation of the third algorithm, and includes the first step of identifying instruction classifications of a basic instruction constituting a variable length VLIW instruction, the second step of identifying a classification of executable functional units based on the instruction classification, the third step of checking whether the basic instruction is assignable to an instruction slot, and the fourth step of assigning the assignable basic instruction to a instruction slot of a processor. The fourth algorithm, as further described later, includes an instruction classification table, an instruction slot table, an instruction assignment table, a functional unit table, and additionally, an instruction category table. The first step identifies, with reference to the instruction category table, an instruction category of a basic instruction constituting a variable length VLIW instruction. The second step identifies, with reference to the instruction classification table, a classification of functional units which can execute the instruction category. The third step checks, with reference to the instruction slot table, whether the basic instruction can be assigned to a logical instruction slot. The fourth step, by referring to the instruction assignment table and the functional unit table, assigns the basic instruction. Basic instructions can be assigned in a right arrangement if assigned in a manner described above.

The first through fourth algorithms will be described sequentially below.

<First Basic Instruction Arrangement Verification Algorithm>

The first basic instruction arrangement verification algorithm utilizes an instruction classification table, an instruction slot table, an instruction assignment table, and a functional unit table, and further uses a logical instruction slot pointer and a physical instruction slot pointer. In other words, the first basic instruction arrangement verification algorithm utilizes a data structure consisting of an instruction classification table, an instruction slot table, an instruction assignment table, a functional unit table, a logical instruction pointer, and a physical instruction pointer.

FIG. 18 is an example of the instruction classification table. The instruction classification table indicates a relationship between a basic instruction and a corresponding functional unit classification which can execute the basic instruction.

FIG. 19 is an example of the instruction slot table. The instruction slot table indicates a relationship between a logical instruction slot and a corresponding functional unit classification which is assignable. The logical instruction slot means an imaginary instruction slot which is assumed to exist and correspond to each functional unit.

FIG. 20 is an example of the instruction assignment table. The instruction assignment table indicates whether a basic instruction is assigned to each physical instruction slot. The physical instruction slot means an instruction slot in a VLIW instruction.

FIG. 21 is an example of the functional unit table. The functional unit table indicates whether a basic instruction is assigned to each functional unit.

The logical instruction slot pointer holds a logical instruction slot number of the instruction slot table. The physical instruction slot pointer holds a number of the basic instructions assigned to the instruction assignment table.

Figure 22:
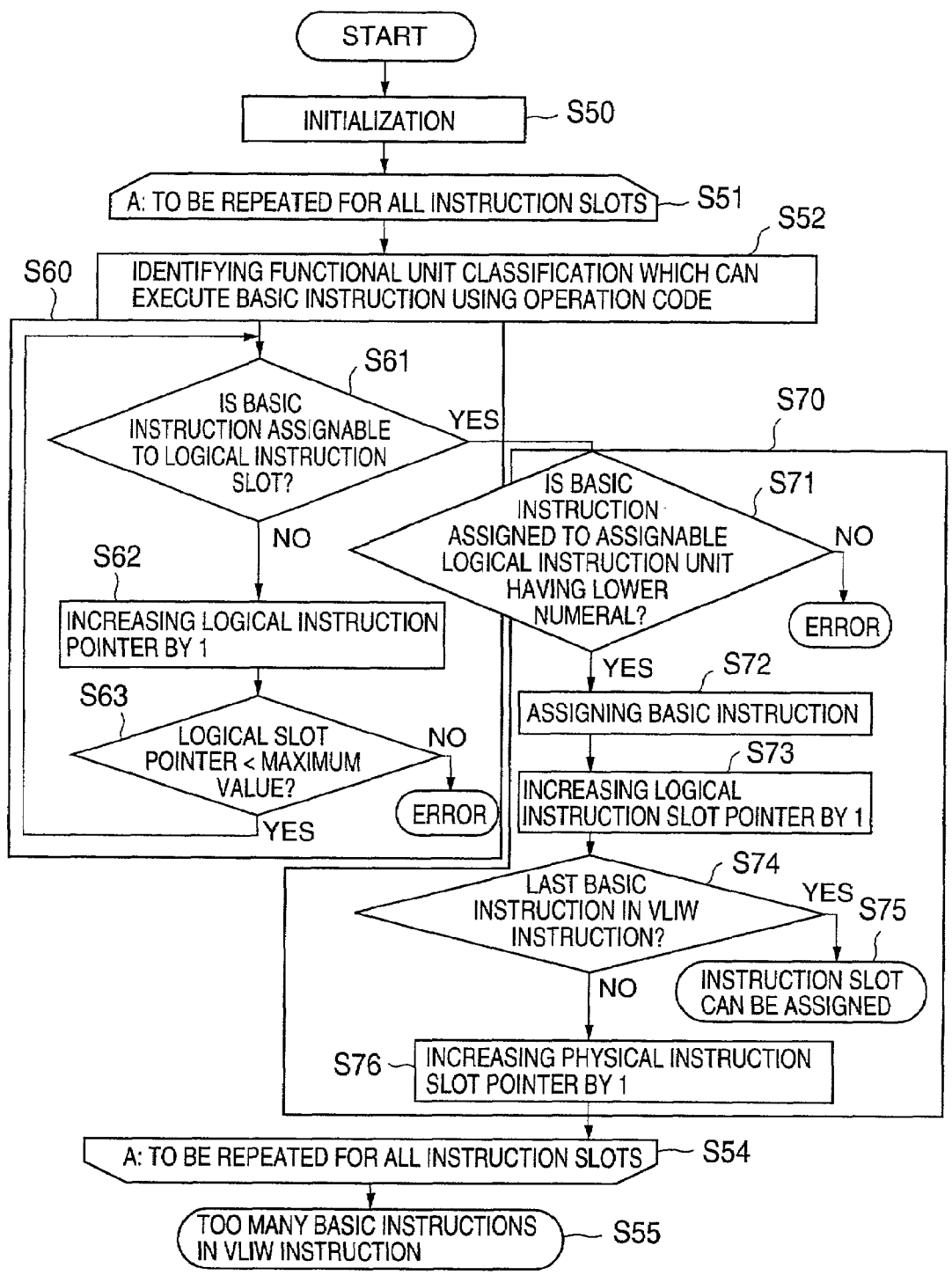
FIG. 22 is a flow chart of the first algorithm for verifying a basic instruction arrangement of variable length VLIW instruction.

FIG. 22 is a flow chart of the first basic instruction arrangement verification algorithm. A step S50 initializes both the physical instruction pointer and the logical instruction pointer to 0. A step S52 identifies a functional unit classification which can execute a basic instruction. The step S52 obtains the functional unit classification by looking up the instruction operation code of the basic instruction in the instruction classification table.

A step S60 finds a logical instruction slot having the lowest numeral, and includes a step S61 through a step S63. The step S61 refers to the instruction slot table, and finds which functional unit classification corresponding to a logical instruction slot indicated by the logical instruction slot pointer is assignable. The step S61 determines that a functional unit classification marked with a circle means the instruction unit classification is assignable, and a classification marked with a dash "-" is not assignable. If the step S61 determines that a basic instruction is not assignable (NO), the step S62 increases the logical instruction slot pointer by 1. If the logical instruction slot pointer exceeds the maximum value (No), the algorithm ends issuing an error. If the logical instruction slot pointer is below the maximum value (Yes), steps S61 through S63 are repeated for the next logical instruction slot.

A step S70 assigns a basic instruction, and further includes steps S71 through S76. If a result of the step S61 is "Yes", the step S71 checks, with reference to the functional unit table, that basic instructions are assigned to all functional units with lower numerals. If no basic instruction is assigned, the algorithm ends issuing an error.

The step S71 is necessary in the case that basic instructions must be assigned to all functional units having lower numerals than the numeral of the assignable functional unit. For example, the step S71 is applicable to the case such that a basic instruction cannot be assigned to IU1 unless another basic instruction is assigned to IU0. If the step S71 determines that the basic instruction can be assigned, the step S72 provides instruction information to the instruction assignment table. The step S72 further switches a flag in the functional unit table indicating that a basic instruction is assigned to a functional unit. The step S73 increases the logical instruction slot pointer by 1. The step S74 checks whether a packing flag of the basic instruction is ON. If the flag is ON, the basic instruction is the last basic instruction of a VLIW instruction (the result of the step S74 is "Yes"), and the algorithm ends at the step S75 without issuing an error. The step S75 determines that the basic instruction arrangement is assignable. If the result of the step S74 is "No", the step S76 increases the physical instruction slot pointer by 1.

The steps S52 through S70 described above are repeated unless the physical instruction slot pointer is below the maximum (Steps S51 and S54). If the pointer exceeds the maximum, the algorithm ends at the step S55 meaning too many basic instructions exists in a VLIW instruction.

The first basic instruction arrangement verification algorithm ensures that VLIW instructions stored in the memory 20 are well arranged so that the variable length VLIW processor can execute.

FIG. 23 is an instruction classification table and FIG. 24 is an instruction slot table, showing the case that the first basic instruction arrangement verification algorithm described above is applied to the variable length VLIW processor shown in FIG. 10.

<Second Basic Instruction Arrangement Verification Algorithm>

The second basic instruction arrangement verification algorithm is remarkable in that, in addition to the executable functional unit classification which is available by the first algorithm, the second algorithm also identifies an executable functional unit number corresponding to an instruction category.

A data structure used by the second basic instruction arrangement verification algorithm includes an instruction classification table, an instruction category table, an instruction slot table, an instruction assignment table, a functional unit table, a logical instruction slot pointer, and a physical instruction slot pointer. In addition to the tables used by the first algorithm, the instruction category table is additionally included in the data structure of the second algorithm.

The instruction classification table is a table of basic instructions and instruction categories corresponding to each basic instruction. The instruction category is a category of an instruction. I_1 means an integer category 1, and includes ADD instruction. I_2 means an integer category 2, and includes DIV instruction. F_1 means a floating point category 1, and includes FADD instruction. B_1 means a branch category 1, and includes BRA instruction.

The instruction category table shows, to each instruction category, an assignable functional unit classification and a bit pattern of the functional unit numbers. FIG. 26 is an example of the instruction category table. An integer category I_2 is not executable by a functional unit of a functional unit number 2 due to a restriction of the processor.

The instruction slot table indicates logical instruction slots, corresponding assignable functional unit classifications, and bit patterns on functional unit numbers. FIG. 27 is an example of the instruction slot table. The logical instruction slot means an imaginary instruction slot on the assumption that there exists an instruction slot corresponding to each functional unit.

The instruction assignment table indicates physical instruction slots and whether a basic instruction is assigned to each physical instruction slot. This instruction assignment table is identical to an instruction assignment table used by the first basic instruction arrangement verification algorithm.

The functional unit table indicates functional units and whether each functional unit is provided with a basic instruction. The functional unit table used for the second algorithm is identical to the functional unit table of the first basic instruction arrangement verification algorithm shown in FIG. 21.

The logical instruction slot pointer indicates a logical instruction slot number of the instruction slot table. The physical instruction slot pointer indicates a number of assigned basic instructions in the instruction assignment table.

Figure 28:
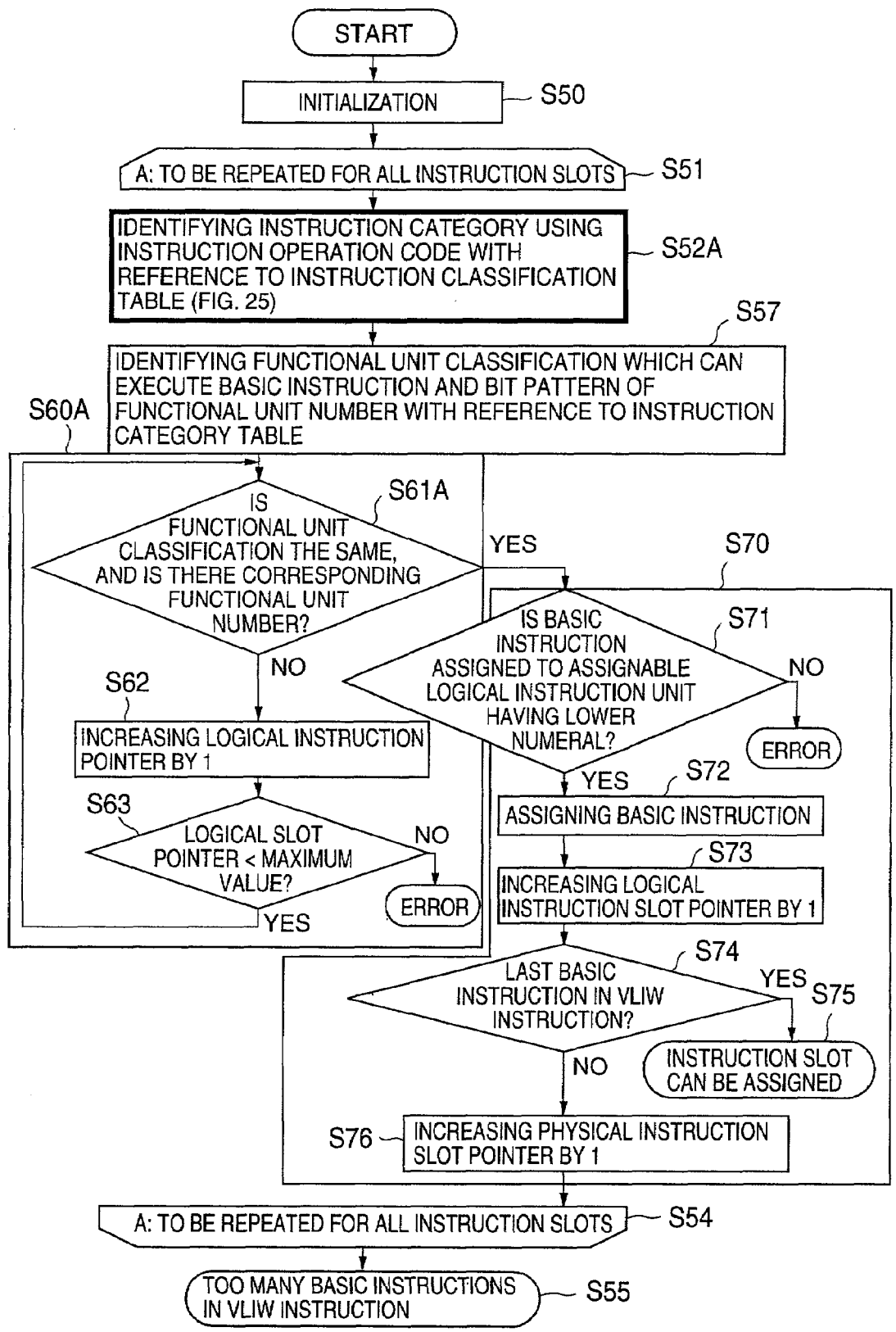
FIG. 28 is a flow chart of the second algorithm for verifying a basic instruction arrangement of a variable length VLIW instruction.

FIG. 28 is a flow chart of the second basic instruction arrangement verification algorithm. Compared with the first basic instruction arrangement verification algorithm shown in FIG. 22, a step S52A replaces the step S52 shown in FIG. 22, and a step S60A replaces the step S60 shown in FIG. 22. A new step S57 is inserted into the flow chart.

A step S50 initializes the physical instruction slot pointer and the logical instruction slot pointer to 0.

In a step S52A, an instruction category of an basic instruction is obtained. Instruction information is taken out of a basic instruction in a VLIW instruction, and the instruction category is obtained by looking up an operation code of the instruction information in the instruction category table.

In a step S57, an executable functional unit is obtained based on the instruction category table. By using the instruction category obtained in the step S51, a corresponding executable functional unit classification and a corresponding functional unit number bit pattern of each functional unit classification are obtained with reference to the instruction classification table.

The step S60A obtains an assignable logical instruction slot having the lowest numeral. With reference to the instruction slot table indicated by, the step S60A determines that a basic instruction is assignable if the following two conditions are met. The first condition is whether there is a circle in the box corresponding to both the number indicated by the logical instruction slot pointer and an assignable functional unit classification. The second condition is that a sum of the corresponding functional unit number bit pattern of the functional unit classification is not 0. Otherwise, the step S60A determines that the basic is not assignable. If the basic instruction is determined by a step S61A not to be assignable, the logical instruction slot pointer is increased by 1 in a step S62. If the instruction is assignable, a step S71 follows. In a step S63, if the logical instruction slot pointer exceeds the maximum value, the algorithm ends issuing an error message. Steps S61A, S62, S63 are repeated for the next logical instruction slot.

In a step S70, the basic instruction is assigned. A step S71 checks, with reference to the functional unit table, that all assignable functional units having lower numerals are provided with basic instructions. If one or more functional units have not provided with basic instructions, the algorithm ends with issuing an error message. If a result of the step S71 is "Yes", the basic instruction is assignable, and corresponding instruction information is provided to the instruction assignment table. A flag in the functional unit table is switched to indicate that the basic instruction is assigned to the functional unit. A step S72 increases the logical instruction slot pointer by 1. A step S74 checks an instruction packing flag and if the flag is ON, i.e., the basic instruction is the last one in a variable length VLIW instruction, the algorithm ends at a step S75 without any error. If the basic instruction is determined not to be the last basic instruction in a VLIW instruction, a step S76 increases the physical instruction slot pointer by 1.

Steps S52 through S70 described above are repeated as long as the physical instruction slot pointer is below the maximum value (Steps S51 and S54). If the pointer exceeds the maximum value, the algorithm ends in a step S55 which indicates that too many basic instructions exist in a VLIW instruction.

The second basic instruction arrangement verification algorithm ensures that the VLIW instruction stored in the memory 20 is a combination of basic instructions executable by the variable length VLIW processor, because the basic instructions are assigned to executable functional unit classifications and further assigned to functional unit numbers corresponding to the instruction category.

<Third Basic Instruction Arrangement Verification Algorithm>

The third basic instruction arrangement verification algorithm uses a data structure which does not include the functional unit table used in the first basic instruction arrangement verification algorithm. Accordingly, the data structure used in the third basic instruction arrangement verification algorithm includes an instruction classification table, an instruction slot table, an instruction assignment table, a logical instruction slot pointer, and a physical instruction slot pointer.

Figure 29:
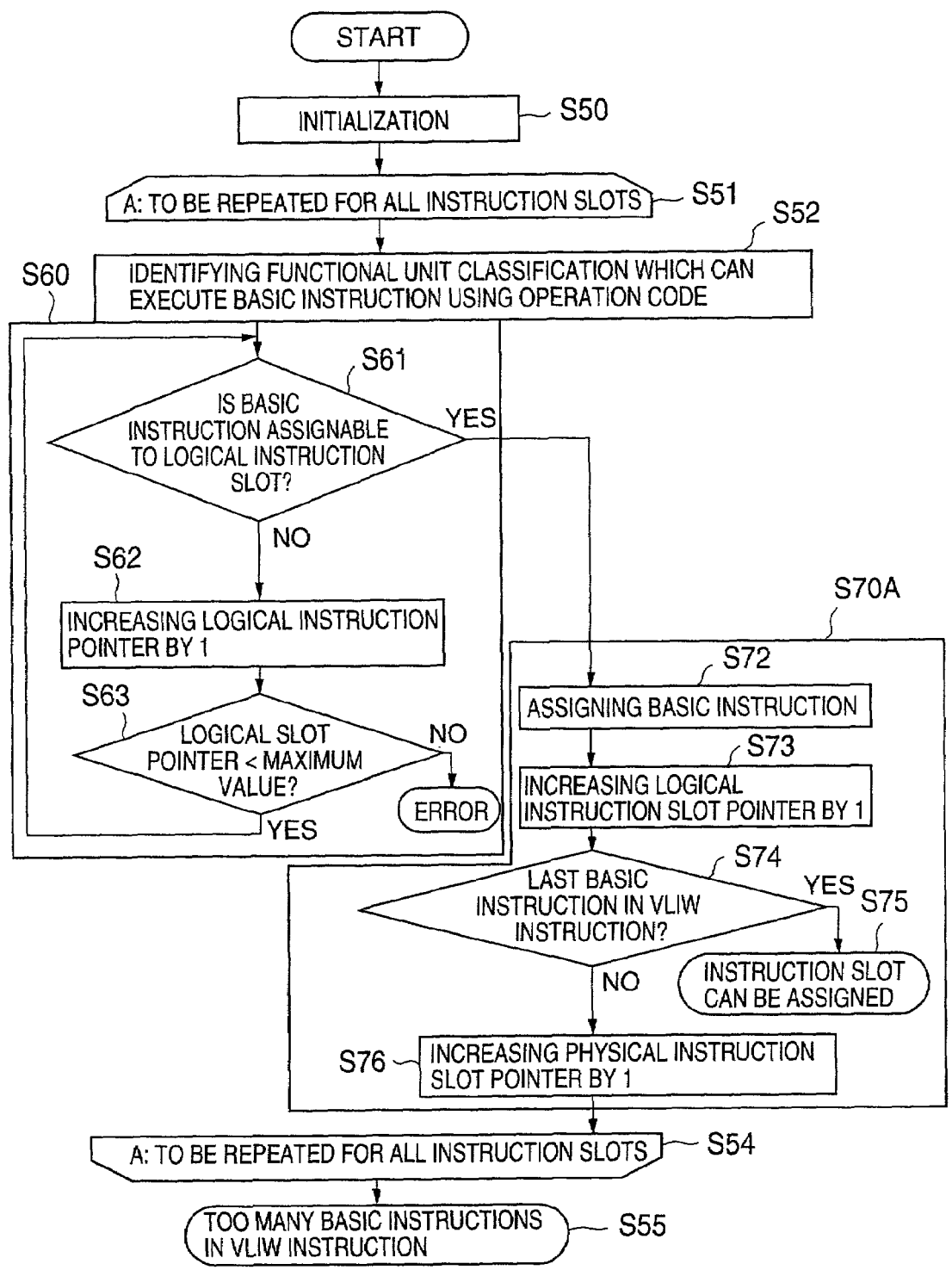
FIG. 29 is a flow chart of the third algorithm for verifying a basic instruction arrangement of a variable length VLIW instruction.

FIG. 29 is a flow chart showing the third basic instruction arrangement verification algorithm. The third algorithm differs from the first basic instruction arrangement verification algorithm in that a step S70A is included instead of the step S70 shown in FIG. 22. The step S70A includes all steps included in the step S70 except for the step S71. In short, the third basic instruction arrangement verification algorithm does not determine that all instruction slots having lower numerals than the numeral of an issuable functional unit by a logical instruction slot are provided with basic instructions with reference to a functional unit table. Accordingly, the third algorithm determines that a VLIW instruction consisting of only I1 assigned to the instruction slot 1, for example, is a normal basic instruction arrangement.

As mentioned above, the third basic instruction arrangement verification algorithm is suitable for basic instruction arrangement where a step S71 constraint is not necessary.

<Fourth Basic Instruction Arrangement Verification Algorithm>

The fourth basic instruction arrangement verification algorithm includes an instruction category table as well as the instruction classification table, the instruction slot table, and the instruction assignment table used in the third basic instruction arrangement verification algorithm. In short, the data structure used for the fourth basic instruction arrangement verification algorithm includes an instruction classification table, an instruction category table, and instruction slot table, an instruction assignment table, a logical instruction slot pointer, and physical instruction slot pointer. Like the third basic instruction arrangement verification algorithm, the fourth basic instruction arrangement verification algorithm does not have the functional unit table used in the first and the second basic instruction arrangement verification algorithms.

Figure 30:
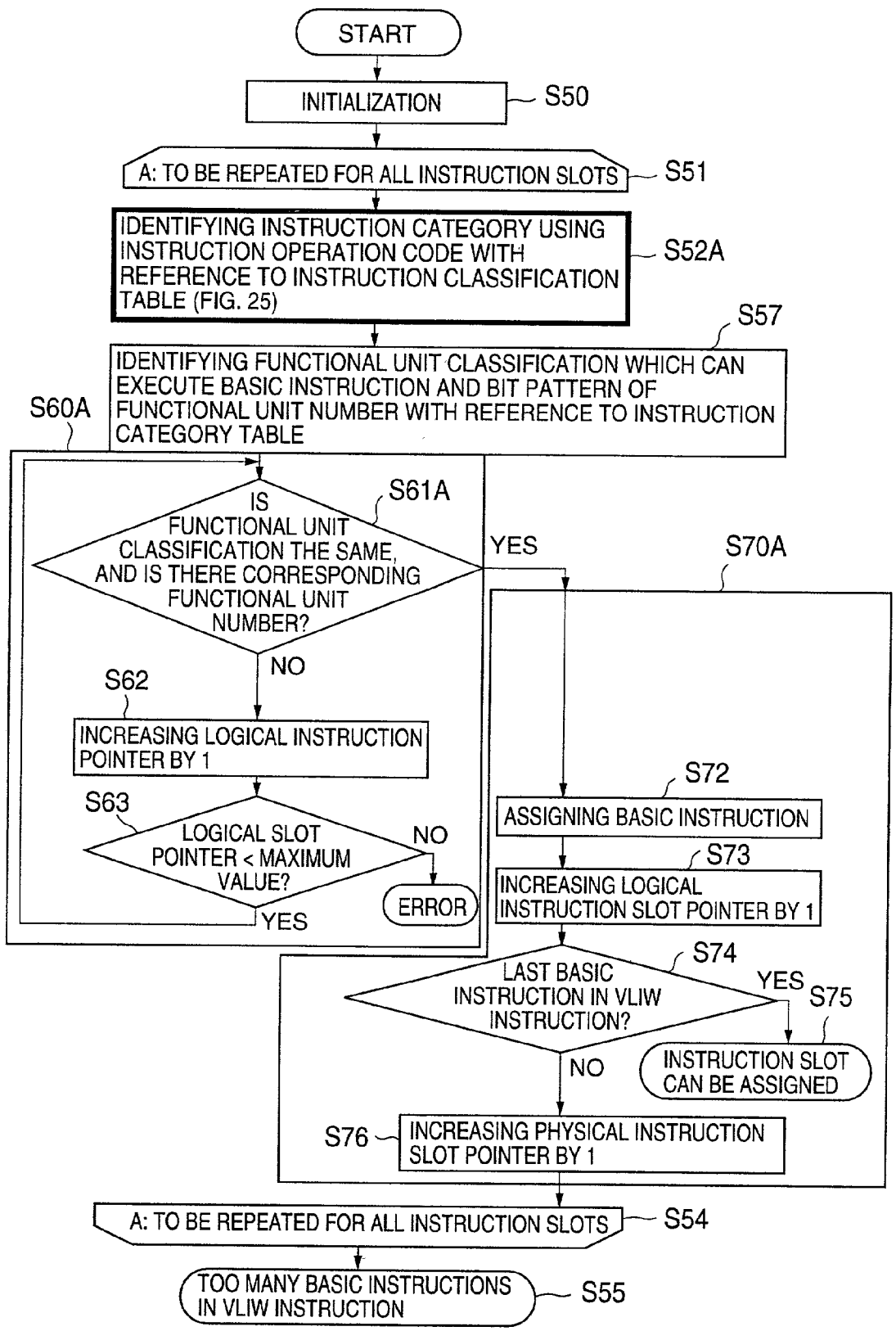
FIG. 30 is a flow chart of the fourth algorithm for verifying a basic instruction arrangement of a variable length VLIW instruction.

FIG. 30 is a flow chart of the fourth basic instruction arrangement verification algorithm. The algorithm differs from the third basic instruction arrangement verification algorithm shown in FIG. 29 in that step S52A and S60A replace the steps S52 and S60, respectively, and a new step S57 is additionally inserted in the flow chart. The steps S52A, S60A, and S57 were described with reference to FIG. 28. The fourth basic instruction arrangement verification algorithm differs from the second basic instruction arrangement verification algorithm in that a step S70A shown in FIG. 29 is used as a replacement with the step S70 shown in FIG. 28.

The fourth basic instruction arrangement verification algorithm is suitable for a case, without the step S71 constraint, that requires verifying a basic instruction arrangement based on an instruction category.

The first through the fourth basic instruction arrangement verification algorithms described above is applicable not only to the first configuration of a variable length VLIW processor shown in FIG. 12, but also to variable length VLIW processors of various configurations. A description of another configuration of a variable length VLIW processor will be given next.

<Second Embodiment of Variable Length VLIW Processor>

Figure 31:
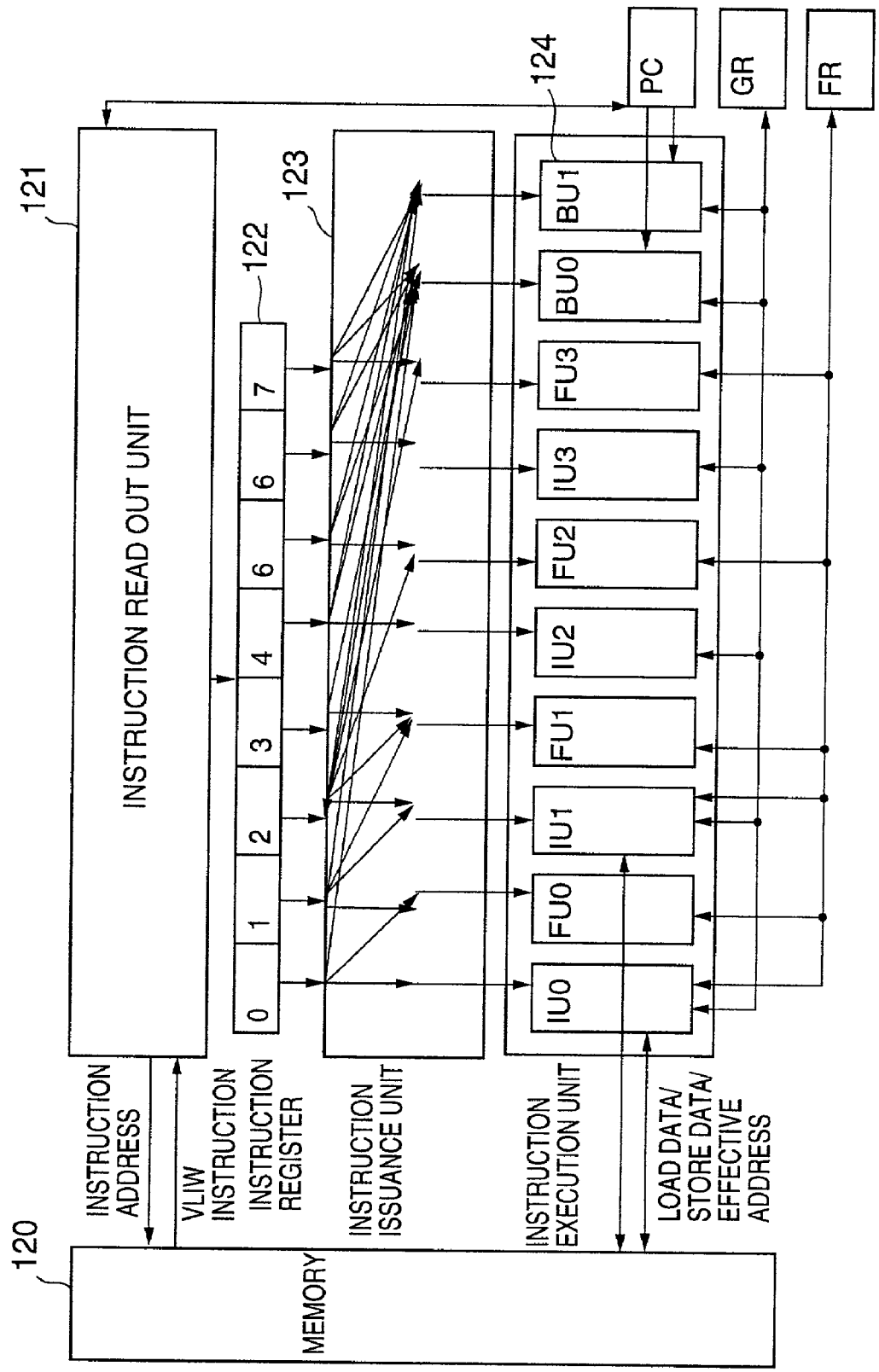
FIG. 31 is a block diagram showing the second configuration of a variable length VLIW processor.

FIG. 31 shows the second embodiment of a variable length VLIW processor which can execute at most 8 instructions at the same time. It will be assumed in the following description that basic instruction arrangements are checked by applying the first basic instruction arrangement verification algorithm previously described in relation to an assembler.

The variable length VLIW processor shown in FIG. 31 includes a memory 120, an instruction readout unit 121, an instruction register 122, an instruction issuance unit 123, an instruction execution unit 124, a general purpose register GR, a floating register FR, and a program counter PC. The instruction execution unit 124 includes integer units IU0, IU1, IU2, and IU3, and floating units FU0, FU1, FU2, and FU3, and branch units BU0, BU1, BU2, and BU3.

As shown in FIG. 32 and FIG. 33, it is assumed that 73 basic instruction arrangements in a VLIW instruction are executable with this processor.

The instruction readout unit 121 retrieves from the memory 120 a memory area storing a VLIW instruction addressed by an address stored in the program counter PC, and stores the VLIW instruction to the instruction register 122. The instruction readout unit 121 increases the address stored in the program counter PC by a number corresponding to a memory size of the VLIW instruction. The instruction register 122 holds the VLIW instruction stored by the instruction readout unit 121. The instruction issuance unit 123 provides the VLIW instruction retrieved from the instruction register 122 to one of corresponding functional units IU, FU, and BU. The instruction issuance unit 123 provides at most 8 basic instructions to at most 8 functional units out of 10 functional units, and the at most 8 basic instructions are executed by this VLIW processor at the same time. Basic instructions stored in each instruction slot are provided to the functional units in the following manner.

A basic instruction stored in the instruction slot 0 can be provided to IU0, FU0, and BU0. A basic instruction stored in the instruction slot 1 can be provided to FU0, IU1, FU1, BU0, and BU1. A basic instruction stored in the instruction slot 2 can be provided to IU1, FU1, IU2, FU2, BU0, and BU1. A basic instruction stored in the instruction slot 3 can be provided to FU1, IU2, FU2, IU3, FU3, BU0, and BU1. A basic instruction stored in the instruction slot 4 can be provided to IU2, FU2, IU3, FU3, and BU0. A basic instruction stored in the instruction slot 5 can be provided to FU2, IU3, FU3, BU0, and BU1. A basic instruction stored in the instruction slot 6 can be provided to IU3, FU3, BU0, and BU1. A basic instruction stored in the instruction slot 7 can be provided to FU3, BU0, and BU1. IU0, IU1, IU2, IU3 execute an integer arithmetic instruction, an integer load instruction, an integer store instruction, a floating point load instruction, and a floating point store instruction.

When an integer arithmetic instruction is provided, the integer units retrieve input operand data from the general purpose register GR, and store a result of an integer arithmetic operation as output operand data to the general purpose register GR. When an integer load instruction is provided, the integer units retrieve input operand data from a register, and calculate an effective address. Then, the integer units retrieve data from a memory area in the memory 120 corresponding to the effective address, and store the data to the general purpose register GR. When an integer store instruction is provided, the integer units retrieve input operand data from the general purpose register GR, and calculate an effective address. Then, the integer units store "store data" to a memory area in the memory 120 corresponding to the effective address. When a floating point load instruction is provided, the integer units retrieve input operand data from a register, and calculate an effective address. Then, the integer units retrieve data stored in a memory area in the memory 120 corresponding to the effective address, and store the data to the floating register FR. When a floating point store instruction is provided, the integer units retrieve input operand data from the floating register FR, and calculate an effective address. Then, the integer units store "store data" to a memory area in the memory 20 corresponding to the effective address.

FU0, FU1, FU2, and FU3 execute a floating point arithmetic instruction. When a floating point arithmetic instruction is provided, the floating units retrieve input operand data from a floating register FR, and perform a floating point arithmetic operation. Then, the floating units store a result of the arithmetic operation as output operand data to the floating register FR.

BU0 and BU1 perform an unconditional branch instruction and a conditional branch instruction. When an unconditional branch instruction is provided, the branch units retrieve input operand data from registers GR and PC, and store a calculated address to a program counter PC. When a conditional branch instruction is provided, the branch units check whether a branch condition is met. If the branch condition is met, the branch units retrieve input operand data from registers GR and PC, and store a calculated address as an address of a destination of the branch in the program counter PC.

In case of a processor which can execute variable VLIW instructions, the VLIW instructions are stored in the memory as shown in FIG. 34.

<Operation of Second Embodiment of Variable Length VLIW Processor>

With reference to FIG. 35, a process in which a VLIW processor shown in FIG. 31 executes a program shown in FIG. 34 will be described. In these figures, "ADD" is an integer arithmetic instruction meaning an addition, "FADD" is a floating point arithmetic instruction meaning an addition.

(Time 1)

(A) The instruction readout unit 121, with reference to an instruction address stored in the program counter PC, retrieves a VLIW instruction 1 stored in the memory 120 as shown in FIG. 34, and stores the VLIW instruction 1 to the instruction register 122. Basic instructions included in the VLIW instruction 1 are stored in the instruction register indicated as Time 1 shown in FIG. 35.

(B) The functional units execute the provided basic instructions as follows. An "ADD" stored in the instruction slot 0 is executed by IU0. A "FADD" stored in the instruction slot 1 is executed by FU0. An "ADD" stored in the instruction slot 2 is executed by IU1. A "FADD" stored in the instruction slot 3 is executed by FU1. An "ADD" stored in the instruction slot 4 is executed by IU2. A "FADD" stored in the instruction slot 5 is executed by FU2. An "ADD" stored in the instruction slot 6 is executed by IU3. A "FADD" stored in the instruction slot 7 is executed by FU3. BU0 and BU1 execute no operation because no basic instruction is provided.

When each functional unit, i.e., IU0, IU1, IU2, IU3, FU0, FU1, FU2, and FU3, finishes the execution of a basic instruction, the execution of the VLIW instruction 1 finishes.

If the first basic instruction arrangement verification algorithm is applied to the basic instruction arrangement verification step S13A-1 of an assembler for the variable length VLIW processor which can execute at most 8 basic instructions at the same time, the instruction classification table and the instruction slot table would be those shown in FIG. 36 and FIG. 37, respectively.

<Third Embodiment of Variable Length VLIW Processor>

In the third embodiment, a basic instruction arrangement in a VLIW instruction is verified by applying the second basic instruction arrangement verification algorithm to the variable length VLIW processor which can execute at most 4 basic instructions at the same time.

A processor is assumed to have the same structure as that of the first embodiment. The second basic instruction arrangement verification algorithm shown in FIG. 28 is used as the algorithm of the basic instruction verification unit 13A-1.

FIG. 38 is an instruction classification table used for the third embodiment. FIG. 39 is an instruction category table for the third embodiment. FIG. 40 is an instruction slot table for the third embodiment.

<Fourth Embodiment of Variable Length VLIW Processor>

In the fourth embodiment described below, a basic instruction arrangement of a VLIW instruction is verified by applying the second basic instruction arrangement verification algorithm to a variable length VLIW processor which can execute at most 8 basic instructions at the same time.

A structure of the processor is the same as that of the second embodiment. The algorithm used in the basic instruction arrangement verification step 13A-1 is the second basic instruction arrangement verification algorithm.

FIG. 41 is an instruction classification table for the fourth embodiment. FIG. 42 is an instruction category table for the fourth embodiment. FIG. 43 is an instruction slot table for the fourth embodiment.

The preferred embodiments of the present invention have been described above. The abovementioned first through fourth algorithms are performed by a computer. If a program having steps describing one of the first through fourth algorithms is written, a computer can execute the program. Accordingly, the present invention includes computer programs which embody the first through fourth algorithms. The present invention further includes computer readable recording media storing these programs. The present invention yet further includes information processing systems having steps embodying the first through fourth algorithms.

Variable length VLIW processors are not limited to the processors previously mentioned, and the instruction processing methods of the present invention is applicable to variable length VLIW processors having different structures and operations.

The present invention is not limited to these embodiments, but various variations and modifications may be made without departing from the scope of the present invention.

This patent application is based on Japanese priority patent application No. 2001-128368 filed on Apr. 25, 2001, the entire contents of which are hereby incorporated by reference.

What is claimed is:

1. A method for instruction processing executing on a computer, comprising:
    identifying a classification of a functional unit which can execute a basic instruction;
    determining whether said basic instruction can be assigned to a logical instruction slot;
    determining whether said basic instruction is arranged in an allowable order; and
    assigning, to a physical instruction slot, said basic instruction determined to be assignable to said logical instruction slot by increasing a logical instruction slot pointer based on a relation between said basic instruction determined to be assignable and another basic instruction assigned to a corresponding logical instruction slot;
    wherein the computer is a variable length Very Long Instruction Word processor with a predefined allowable arrangement of basic instructions, the computer having a plurality of physical instruction slots and a plurality of functional units corresponding one-to-many or many-to-many, and the logical instruction slot is an imaginary instruction slot which corresponds to the functional unit.

2. The method for instruction processing as claimed in claim 1, wherein said identifying is divided into identifying an instruction category of a basic instruction, and identifying a classification of a functional unit which can execute said instruction category.

3. The method for instruction processing as claimed in claim 1, further comprising prior to said assigning, checking a relationship between said basic instruction that can be assigned to said logical instruction slot and other basic instructions to be assigned to other logical instruction slots.

4. The method for instruction processing as claimed in claim 2, further comprising, prior to said assigning, checking a relationship between said basic instruction that can be assigned to said logical instruction slot and other basic instructions to be assigned to other logical instruction slots.

5. The method for instruction processing as claimed in claim 3, wherein said determining includes identifying said logical instruction slot having a lowest numeral determined to be assignable.

6. The method for instruction processing as claimed in claim 4, wherein said assigning includes identifying said logical instruction slot having a lowest numeral determined to be assignable.

7. The method for instruction processing as claimed in claim 3, wherein said identifying, determining, checking and assigning are repeated for all instruction slots.

8. The method for instruction processing as claimed in claim 4, wherein said identifying, determining, checking and assigning are repeated for all instruction slots.

9. A computer program executing on a computer and stored on a computer readable medium, comprising:
    identifying a classification of a functional unit which can execute a basic instruction;
    determining whether said basic instruction can be assigned to a logical instruction slot;

determining whether said basic instruction is arranged in an allowable order; and assigning, to a physical instruction slot, said basic instruction determined to be assignable to said logical instruction slot by increasing a logical instruction slot pointer based on a relation between said basic instruction determined to be assignable and another basic instruction assigned to a corresponding logical instruction slot;

wherein the computer is a variable length Very Long Instruction Word processor with a predefined allowable arrangement of basic instructions, the computer having a plurality of physical instruction slots and a plurality of functional units corresponding one-to-many or many-to-many, and the logical instruction slot is an imaginary instruction slot which corresponds to the functional unit.

10. A computer program as claimed in claim 9, wherein said identifying is divided into identifying an instruction category of a basic instruction, and identifying a classification of a functional unit which can execute said instruction category.

11. The computer program as claimed in claim 9, further comprising, prior to said assigning, checking a relationship between said basic instruction than can be assigned to said logical instruction slot and other basic instructions to be assigned to other logical instruction slots.

12. The computer program as claimed in claim 10, further comprising, prior to said assigning, checking a relationship between said basic instruction that can be assigned to said logical instruction slot and other basic instructions to be assigned to other logical instruction slots.

13. The method for instruction processing as claimed in claim 1, further comprising:

arranging, via computer, a basic instruction in a logical instruction slot having an assignable lowest numeral; and verifying an arrangement of a variable-length instruction including the basic instruction by increasing a logical instruction slot pointer.

14. The method for instruction processing as claimed in claim 1, wherein the logical instruction slot to which the basic instruction is assigned has an assignable lowest numeral.

15. The method for instruction processing as claimed in claim 1, further comprising:

checking whether all logical instruction slots have lower numerals than a numeral of the logical instruction slot to which said basic instruction is assigned.

16. The computer program as claimed in claim 9, further comprising:

checking whether all logical instruction slots have lower numerals than a numeral of the logical instruction slot to which said basic instruction is assigned.

\* \* \* \* \*

UNITED STATES PATENT AND TRADEMARK OFFICE
CERTIFICATE OF CORRECTION

| | |
|---|---|
| PATENT NO. | : 7,647,473 B2 |
| APPLICATION NO. | : 10/053707 |
| DATED | : January 12, 2010 |
| INVENTOR(S) | : Teruhiko Kamigata et al. |

It is certified that error appears in the above-identified patent and that said Letters Patent is hereby corrected as shown below:

Column 21, Line 22, claim 11, change "than" to --that--.

Column 22, Line 9, claim 13, change "variable-length" to --variable length--.

Signed and Sealed this

Sixth Day of April, 2010

David J. Kappos
*Director of the United States Patent and Trademark Office*